(12) United States Patent
Yamane et al.

(10) Patent No.: US 11,245,816 B2
(45) Date of Patent: *Feb. 8, 2022

(54) IMAGE PROCESSING APPARATUS, IMAGE PROCESSING METHOD, AND SURGICAL SYSTEM

(71) Applicant: SONY CORPORATION, Tokyo (JP)

(72) Inventors: Masahito Yamane, Kanagawa (JP); Tsuneo Hayashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,236

(22) Filed: Aug. 29, 2019

(65) Prior Publication Data

US 2019/0387135 A1 Dec. 19, 2019

Related U.S. Application Data

(63) Continuation of application No. 15/304,559, filed as application No. PCT/JP2015/061311 on Apr. 13, 2015, now Pat. No. 10,440,241.

(30) Foreign Application Priority Data

Apr. 24, 2014 (JP) .................................. 2014-090566

(51) Int. Cl.
*H04N 5/225* (2006.01)
*G06T 1/20* (2006.01)
(Continued)

(52) U.S. Cl.
CPC .............. *H04N 5/225* (2013.01); *G06T 1/20* (2013.01); *G06T 7/11* (2017.01); *G09G 5/00* (2013.01);
(Continued)

(58) Field of Classification Search
None
See application file for complete search history.

(56) References Cited

U.S. PATENT DOCUMENTS

| 5,448,655 A | 9/1995 | Yamaguchi |
| 2005/0041031 A1* | 2/2005 | Diard ..................... G09G 5/393 |
| | | 345/505 |

(Continued)

FOREIGN PATENT DOCUMENTS

| JP | 2-40688 A | 2/1990 |
| JP | 5-324583 A | 12/1993 |

(Continued)

OTHER PUBLICATIONS

Office Action dated Aug. 28, 2019 in corresponding European Patent Application No. 15 782 241.2, 13 pages.

(Continued)

*Primary Examiner* — James M Anderson, II
(74) *Attorney, Agent, or Firm* — Oblon, McClelland, Maier & Neustadt, L.L.P.

(57) ABSTRACT

The present technology relates to an image processing apparatus, an image processing method, and a surgical system, by which a captured image can be displayed with low latency in almost real time. A DMA controller 51 of a CPU 31 divides image data, which is input via an IF card 34, by the number of GPU cards 35-1, 35-2 in a horizontal direction and allocates them. In each of the GPU cards 35-1, 35-2, the image data is subjected to time division processing in the vertical direction. With this, the use of the plurality of GPU cards 35-1, 35-2 increases the speed of processing associated with display for the image data. High-speed display is realized due to reduction in latency. The present technology is applicable to an endoscopic camera, a surgical microscope, and the like.

18 Claims, 17 Drawing Sheets

(51) Int. Cl.
*G06T 7/11* (2017.01)
*G09G 5/00* (2006.01)
*G09G 5/36* (2006.01)
*H04N 7/18* (2006.01)

(52) U.S. Cl.
CPC ............ *G09G 5/36* (2013.01); *H04N 7/18* (2013.01); *G06T 2207/10004* (2013.01)

(56) References Cited

U.S. PATENT DOCUMENTS

| | | | |
|---|---|---|---|
| 2010/0053177 A1 | 3/2010 | Diard et al. | |
| 2010/0260428 A1 | 10/2010 | Ueno et al. | |
| 2012/0110224 A1 | 5/2012 | Tanaka et al. | |
| 2013/0271757 A1* | 10/2013 | Kang | A61B 5/0066 356/300 |

FOREIGN PATENT DOCUMENTS

| | | |
|---|---|---|
| JP | 2000-312327 A | 11/2000 |
| JP | 2010-263475 A | 11/2010 |
| JP | 2012-98883 A | 5/2012 |
| JP | 2012-98883 A5 | 5/2012 |
| JP | 2013-182504 A | 9/2013 |

OTHER PUBLICATIONS

International Search Report dated Jul. 7, 2015 in PCT/JP2015/061311.
Extended European Search Report dated Aug. 14, 2017 in Patent Application No. 15782241.2.
Combined Office Action and Search Report dated Oct. 29, 2018 in Chinese Patent Application No. 201580020303.2 citing document AA therein, 17 pages (with English translation).
Office Action dated Jun. 4, 2019 in Japanese Patent Application No. 2016-514864, with English-language translation, 14 pages.

* cited by examiner

| $\frac{1}{16}$ | $\frac{2}{16}$ | $\frac{1}{16}$ |
|---|---|---|
| $\frac{2}{16}$ | $\frac{4}{16}$ | $\frac{2}{16}$ |
| $\frac{1}{16}$ | $\frac{2}{16}$ | $\frac{1}{16}$ |

FIG.6

IMAGE PROCESSING APPARATUS, IMAGE PROCESSING METHOD, AND SURGICAL SYSTEM

CROSS-REFERENCE TO RELATED APPLICATIONS

This application is a continuation of U.S. application Ser. No. 15/304,559, filed Oct. 17, 2016, which is a National Stage of International Application No. PCT/JP2015/061311, filed Apr. 13, 2015, and claims priority to Japanese Patent Application No. 2014-090566, filed Apr. 24, 2014. The entire contents of each of which are incorporated herein by reference.

TECHNICAL FIELD

The present technology relates to an image processing apparatus, an image processing method, and a surgical system, and more particularly to an image processing apparatus, an image processing method, and a surgical system, by which low-latency image display can be realized.

BACKGROUND ART

In recent years, endoscopic surgery is performed rather than conventional abdominal surgery in medical practice. It is desirable for image processing apparatuses used in the endoscopic surgery or the like to realize, in particular, low-latency image display.

Meanwhile, there has been proposed a technology of enabling a captured image to be displayed at high speed with a minimized time lag.

For example, the following technology (see Patent Document 1) has been proposed. In this technology, an image is divided into regions in a vertical direction. A plurality of processors process the divided regions of the image in parallel. In this manner, high-speed display is realized.

Patent Document 1: Japanese Patent Application Laid-open No. HEI 2-040688

SUMMARY

Problem to be Solved

However, in the technology of Patent Document 1 above, when an image is divided in units of lines, in the case of the processors configured to each independently include a memory for processing like a GPU (Graphics Processing Unit), processes thereof need to overlap in units of lines, and hence overhead increases.

As a result, due to processing for the overhead, the number of lines to be processed increases as a whole. Thus, the amount of computation increases, which sometimes prevents improvement of processing speed being enhanced.

The present technology has been made in view of the above-mentioned circumstances, in particular, for enabling a captured image to be displayed at high speed by dividing an image into regions in a horizontal direction, allocating the divided regions of the image to a plurality of processors, performing time division processing in a vertical direction on the allocated regions by the processors, setting largest overhead to a top region of the regions divided in the vertical direction, and sequentially performing processing.

Means for Solving the Problem

An image processing apparatus according to an aspect of the present technology includes a plurality of arithmetic processing units that perform processing on each of ranges of an image obtained by capturing a surgical site of a patient, in a time division manner, the ranges being obtained by dividing the image in a vertical direction, in which the arithmetic processing units each perform processing with the image divided by the number of arithmetic processing units in a horizontal direction being time-divided in the vertical direction.

The plurality of arithmetic processing units may be constituted of a plurality of GPUs (Graphical Processing Units), and the arithmetic processing unit may perform the processing on the image divided by the number of GPUs in the horizontal direction.

The processing performed on the image may be filtering processing using n-stage filters.

The n-stage filters sequentially perform processing on the ranges obtained by dividing the image in the vertical direction, downward from a range at an uppermost stage in the vertical direction in a time division manner.

The image processing apparatus may further include a timing control unit that controls a timing for computation of the arithmetic processing unit on the basis of the amount of processing performed on the image and the processing speed of the arithmetic processing unit, the amount of processing being calculated on the basis of the number of divisions of the image in the horizontal direction and the number of divisions of the image in the vertical direction.

A processing range of the ranges obtained by time-dividing the image in the vertical direction may include a reference pixel necessary for processing in a second period, the processing range being processed in a first period, the second period being subsequent to the first period.

The arithmetic processing unit may include a memory for buffering a result of processing, and, in the processing in the second period, arithmetic processing may be executed using a result of processing corresponding to the reference pixel, the result of processing in the first period being buffered in the memory and including the result of processing corresponding to the reference pixel.

The arithmetic processing unit may include a memory for buffering a result of processing, a processing range for an uppermost stage in the vertical direction of the ranges obtained by dividing the image in the vertical direction may be a range including the number of lines of a reference pixel necessary for processing of the filters in processing ranges for a second stage and subsequent stages in the vertical direction, the processing range for the uppermost stage in the vertical direction being processed by the filter at each stage, and the arithmetic processing unit may execute, when executing arithmetic processing for the processing by the filter, arithmetic processing using a result of processing corresponding to the reference pixel in processing using the reference pixel, the result of processing of filtering processing up to a pre-stage being buffered in the memory and including the result of processing corresponding to the reference pixel.

The arithmetic processing unit may perform at least magnification processing on the image obtained by capturing the surgical site of the patient.

The image obtained by capturing the surgical site of the patient may be an image captured by an endoscope.

The image obtained by capturing the surgical site of the patient may be an image captured by a microscope.

An image processing method according to an aspect of the present technology is an image processing method for an image processing apparatus, the image processing apparatus including a plurality of arithmetic processing units that perform processing on each of ranges of an image captured by an imaging apparatus, in a time division manner, the ranges being obtained by dividing the image in a vertical direction, in which the arithmetic processing units each perform processing with the image divided by the number of arithmetic processing units in a horizontal direction being time-divided in the vertical direction.

The image may be an image captured by an endoscope.

The image may be an image captured by a microscope.

A surgical system according to an aspect of the present technology includes: an imaging apparatus that captures a surgical site of a patient; and an image processing apparatus including a plurality of arithmetic processing units that perform processing on each of ranges of an image captured by the imaging apparatus, in a time division manner, the ranges being obtained by dividing the image in a vertical direction, the arithmetic processing units each performing processing with the image divided by the number of arithmetic processing units in a horizontal direction being time-divided in the vertical direction.

In the aspect of the present technology, the plurality of arithmetic processing units perform the processing on each of the ranges of the image obtained by capturing the surgical site of the patient, in the time division manner, the ranges being obtained by dividing the image in the vertical direction. The processing is performed with the image divided in the horizontal direction by the number of arithmetic processing units being time-divided in the vertical direction.

Effects

In accordance with the aspect of the present technology, it becomes possible to realize display processing for a captured image with low latency and to display the captured image at high speed in real time.

BRIEF DESCRIPTION OF DRAWINGS

FIG. 6 A diagram showing an example of a filter for processing an image.

DESCRIPTION OF PREFERRED EMBODIMENTS

<Configuration Example of Image Processing Apparatus>

Figure 1:
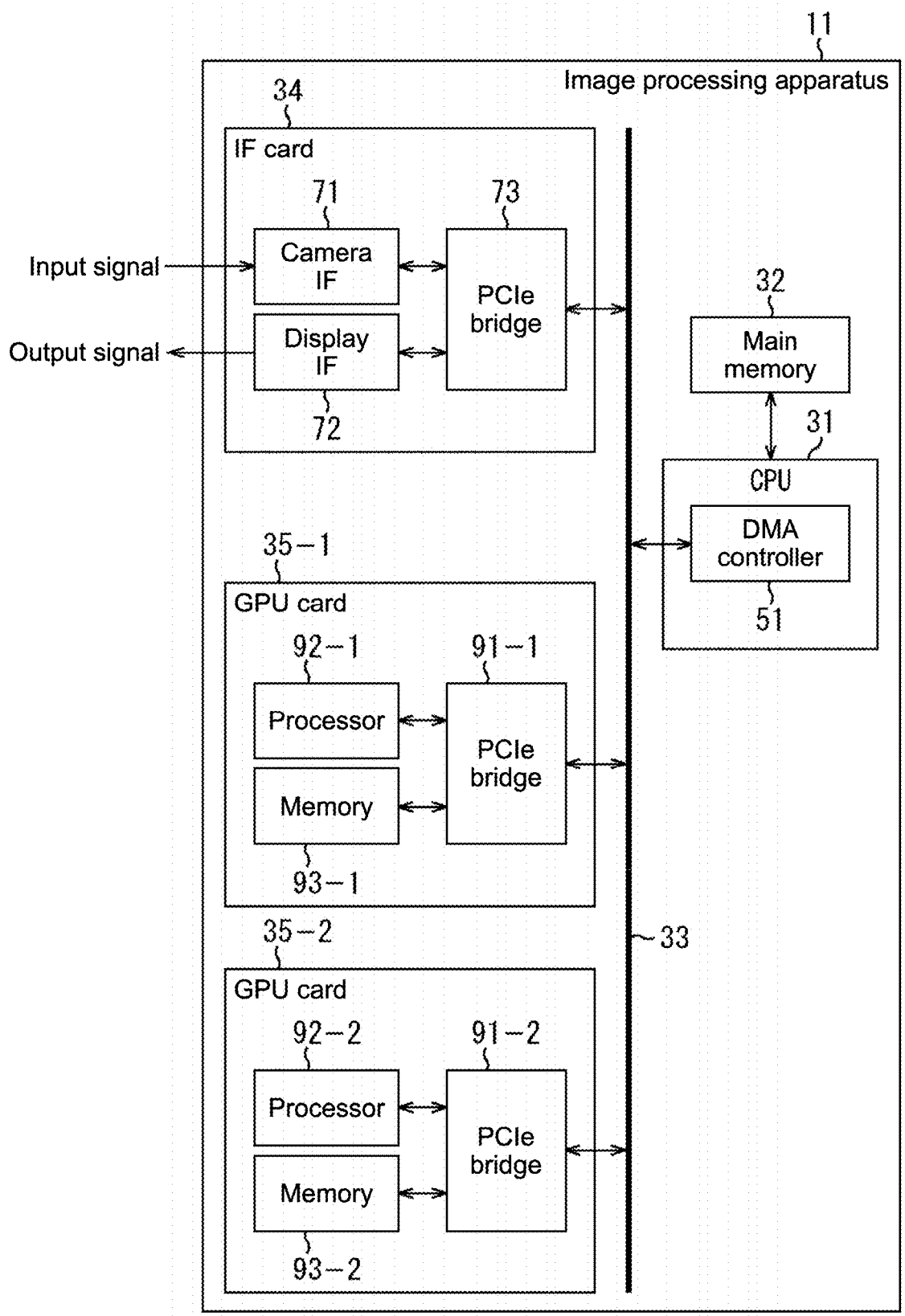
FIG. 1 A block diagram describing a configuration of an embodiment of an image processing apparatus to which the present technology is applied.

FIG. 1 is a block diagram showing a configuration example of an embodiment of an image processing apparatus to which the present technology is applied.

An image processing apparatus 11 shown in FIG. 1 receives input of image data captured by an imaging apparatus such as a camera (not shown) and subjects the image data to various types of processing. Then, the image processing apparatus 11 outputs the image data to a display apparatus such as a display (not shown). The display apparatus displays the image data as an image.

More specifically, the image processing apparatus 11 includes a CPU (Central Processing Unit) 31, a main memory 32, a bus 33, an IF (Interface) card 34, and GPU (Graphical Processing Unit) cards 35-1, 35-2. Note that the GPU cards 35-1, 35-2 will be simply referred to as GPU cards 35 when they are not particularly needed to be discriminated from each other, and the same applies to other configurations.

The CPU (Central Processing Unit) 31 comprehensively controls operations of the image processing apparatus 11. Further, the CPU 31 includes a DMA (Direct Memory Access) controller 51. Note that, as used herein, the term "DMA" represents Direct Memory Access and refers to an operation of directly transferring data among the IF card 34, the main memory 32, and the GPU cards 35 via the bus 33 without being directly controlled by the CPU 31. That is, the DMA controller 51 controls a transfer source, a transfer destination, and a transfer timing in a transfer operation using the DMA not directly controlled by the CPU 31.

More specifically, the DMA controller 51 temporarily stores image data in the main memory 32. The image data is supplied as an input signal by the camera (not shown) via the IF card 34 and the bus 33. Further, the DMA controller 51 divides the image data, which is stored in the main memory 32, into ranges in a manner that depends on the image data stored in the main memory 32, the processing capabilities of processors 92-1, 92-1 of the GPU cards 35-1, 35-2, and the contents of processing. Further, the DMA controller 51 allocates a timing for reading out the divided image data items for each range and a timing for storing processed image data items again. In addition, at each of the allocated timings, the DMA controller 51 sequentially supplies the divided image data items to the GPU cards 35-1, 35-2 and sequentially stores the processed image data items in the main memory 32. Then, the DMA controller 51 outputs the processed image data items stored in the main memory 32, to the display (not shown) via the bus 33 and the IF card 34. Each of the processed image data items is output as an output signal. The display displays the processed image data items.

The IF (Interface) card 34 includes a camera IF 71, a display IF 72, and a PCIe (Peripheral Component Interconnect Express) bridge 73. Under the control of the DMA controller 51, the camera IF 71 of the IF card 34 receives image data supplied from the camera (not shown) as an input signal and supplies the image data to the main memory 32 via the PCIe bridge 73 and the bus 33. Further, under the control of the DMA controller 51, the display IF 72 of the IF card 34 outputs processed image data items, which are supplied from the main memory 32 via the bus 33 and the PCIe bridge 73, to the display (not shown). Each of the processed image data items is output as an output signal.

The GPU cards 35-1, 35-2 respectively includes PCIe bridges 91-1, 91-2, processors 92-1, 92-2, and memories 93-1, 93-2. Under the control of the DMA controller 51 of the CPU 31, the GPU cards 35 temporarily store image data items, which are supplied from the main memory 32 via the bus 33 and the PCIe bridges 91, in the memories 93. Then, while sequentially reading out the image data items stored in the memories 93, the processors 91 subject the image data items to predetermined processing and buffers results of processing to the memories 93 if necessary and outputs the results of processing to the CPU 31 via the PCIe bridges 91 and the bus 33. Note that, although the two GPU cards 35 are exemplarily shown in FIG. 1, two or more GPU cards may be provided.

<Outline of Image Processing>

Next, referring to FIG. 2, image processing performed by the image processing apparatus 11 shown in FIG. 1 will be described.

Figure 2:
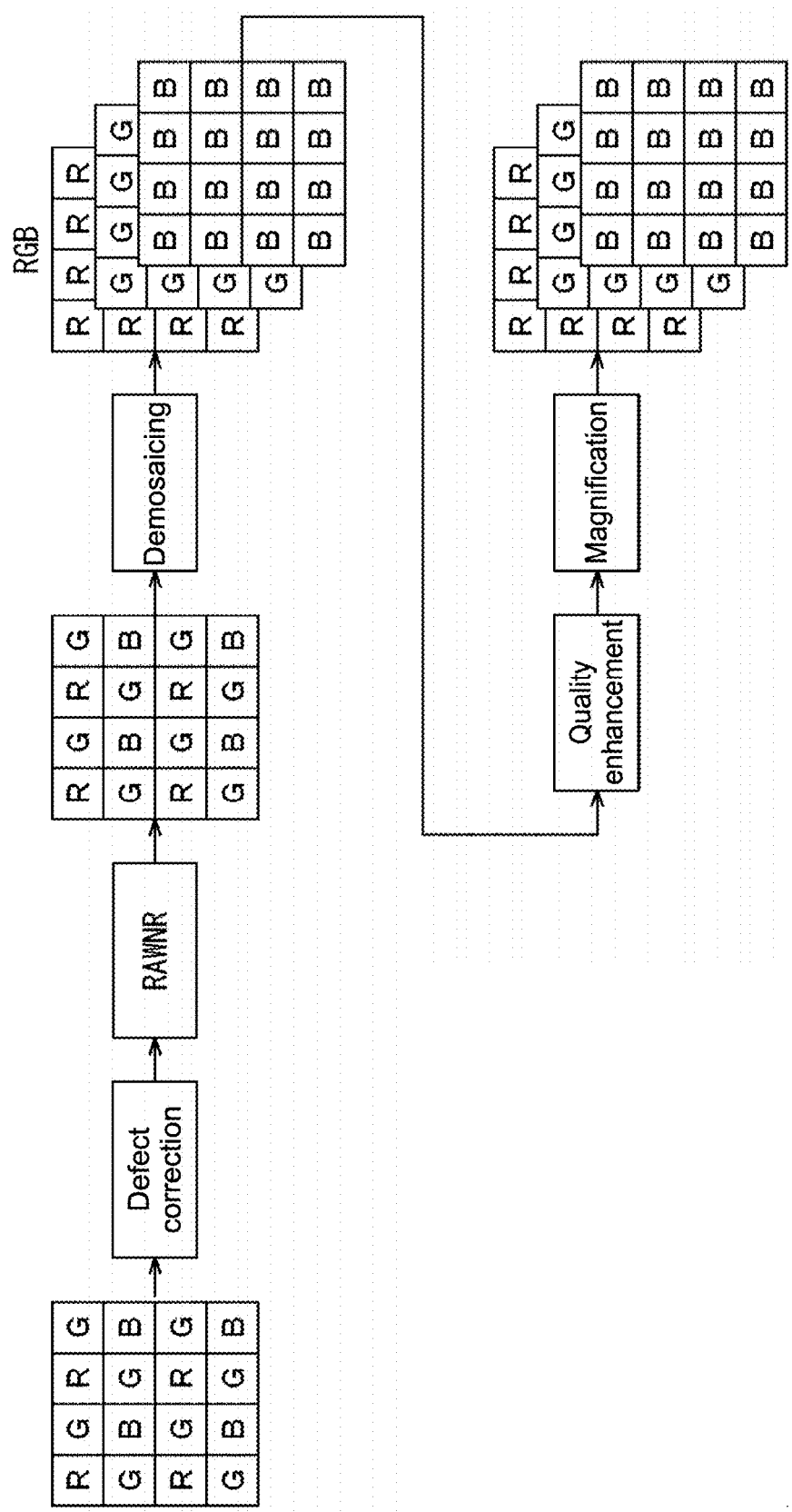
FIG. 2 A diagram describing processing of the image processing apparatus shown in FIG. 1.

As shown by arrow marks from the upper left part of FIG. 2, image data (left-most part) captured by the camera (not shown), which is formed of a pixel array that is the Bayer array, for example, is subjected to defect correction processing and RAWNR (Noise Reduction) processing. Then, a R (red) image, a G (green) image, and a B (blue) image (RGB images in the figure) are generated by demosaicing processing. In addition, the R (red) image, the G (green) image, and the B (blue) image after the demosaicing processing are subjected to quality enhancement processing. Thereafter, the R (red) image, the G (green) image, and the B (blue) image that constitute an output image are generated by magnification processing. The thus generated R (red) image, G (green) image, and B (blue) image are output as an output signal to the display unit such as the display (not shown) and displayed.

<Reduction in Latency>

Figure 3:
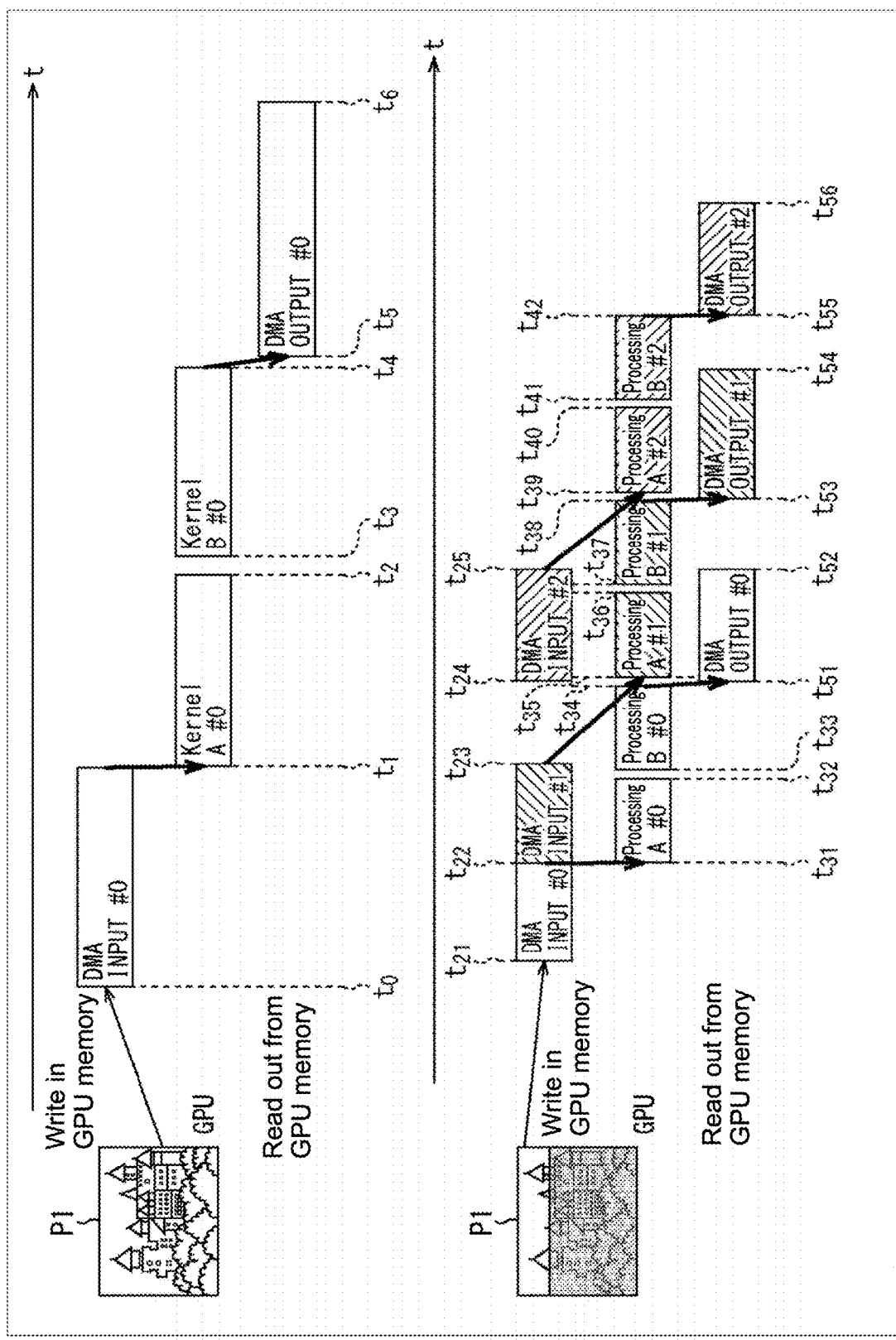
FIG. 3 A diagram describing a difference between conventional image processing and image processing according to the present technology.

When the image processing as described above is executed for each frame as in the past, the processing is as shown in a time chart as shown in the upper stage of FIG. 3. Note that, here, it is assumed that only two types of processing A and B are performed on an image. Further, in the upper stage of FIG. 3, a configuration including a single GPU card identical to the GPU card 35 is assumed.

That is, from a point of time t0 to a point of time t1, as indicated by "DMA INPUT #0" in the figure, image data supplied as an input signal by the DMA controller 51 is written and stored in the main memory 32.

From the point of time t1 to a point of time t2, as indicated by "Kernel A #0" in the figure, the image data stored in the main memory 32 is supplied to the GPU card 35 by the DMA controller 51 and the processing A is executed by the processor 92 of the GPU card 35.

From a point of time t3 to a point of time t4, as indicated by "Kernel B #0" in the figure, the image data stored in the main memory 32 is supplied to the GPU card 35 by the DMA controller 51, the processing B is executed by the processor 92 of the GPU card 35, and a result of processing is returned to the main memory 32.

From a point of time t5 to a point of time t6, as indicated by "DMA OUTPUT #0" in the figure, the image data, which is subjected to the processing A and B and stored in the main memory 32, is read out and output by the DMA controller 51.

In this case, when an overall frame is processed by the single GPU card 35 before it is displayed, the overall frame cannot be displayed as the image unless the result of processing for the single frame is generated. Further, the processing time greatly increases and the latency also greatly increases, and hence there is a fear that the display may be delayed.

In view of this, in the image processing apparatus 11 shown in FIG. 1, as shown in the lower stage of FIG. 3, the frame is divided into some ranges in a vertical direction and the processing is divided and executed, such that the latency is reduced. Note that an example in the case where the frame is divided into three image data items #0 to #2 and processing is performed on each of the image data items #0 to #2 is shown in the lower stage of FIG. 3.

That is, in the lower stage of FIG. 3, from a point of time t21 to a point of time t22, as indicated by "DMA INPUT #0" in the figure, the image data item #0 supplied as an input signal by the DMA controller 51 is written and stored in the main memory 32.

From a point of time t31 to a point of time t32, as indicated by "Processing A #0" in the figure, the image data item #0 stored in the main memory 32 is supplied to the GPU card 35 by the DMA controller 51 and the processing A is executed by the processor 92 of the GPU card 35.

At this time, in parallel with the processing "Processing A #0", from the point of time t22 to a point of time t23, as indicated by "DMA INPUT #1" in the figure, the image data item #1 supplied as an input signal by the DMA controller 51 is stored in the main memory 32.

From a point of time t33 to a point of time t34, as indicated by "Processing B #0" in the figure, the image data stored in the main memory 32 is supplied to the GPU card 35 by the DMA controller 51, the processing B is executed by the processor 92 of the GPU card 35, and a result of processing is returned to the main memory 32.

From a point of time t51 to a point of time t52, as indicated by "DMA OUTPUT #0" in the figure, the image data item #0, which is subjected to the processing A and B and stored in the main memory 32, is output by the DMA controller 51.

In parallel with the processing "DMA OUTPUT #0", from a point of time t35 to a point of time t36, as indicated by "Processing A #1" in the figure, the image data item #1 stored in the main memory 32 is supplied to the GPU card 35 by the DMA controller 51 and the processing A is executed by the processor 92 of the GPU card 35.

In addition, in parallel with the processing "Processing A #1", from a point of time t24 to a point of time t25, as indicated by "DMA INPUT #2" in the figure, the image data item #2 supplied as an input signal by the DMA controller 51 is stored in the main memory 32.

From a point of time t37 to a point of time t38, as indicated by "Processing B #1" in the figure, the image data item #1 stored in the main memory 32 is supplied to the GPU card 35 by the DMA controller 51, the processing B is executed by the processor 92 of the GPU card 35, and a result of processing is returned to the main memory 32.

From a point of time t53 to a point of time t54, as indicated by "DMA OUTPUT #1" in the figure, the image data item #1, which is subjected to the processing A and B and stored in the main memory 32, is output by the DMA controller 51.

In parallel with the processing "DMA OUTPUT #1", from a point of time t39 to a point of time t40, as indicated by "Processing A #2" in the figure, the image data item #2 stored in the main memory 32 is supplied to the GPU card 35 by the DMA controller 51 and the processing A is executed by the processor 92 of the GPU card 35.

From a point of time t41 to a point of time t42, as indicated by "Processing B #2" in the figure, the image data item #2 stored in the main memory 32 is supplied to the GPU card 35 by the DMA controller 51, the processing B is executed by the processor 92 of the GPU card 35, and a result of processing is returned to the main memory 32.

From a point of time t55 to a point of time t56, as indicated by "DMA OUTPUT #2" in the figure, the image data item #2, which is subjected to the processing A and B and stored in the main memory 32, is output by the DMA controller 51.

In accordance with the processing as described above, the image data items #0 to #2 are subjected to time division processing and "DMA INPUT", "Processing A", "Processing B", and "DMA OUTPUT" are processed in parallel if necessary. Thus, the latency can be reduced also as a whole. Further, the image data items #0 to #2 subjected to the processing A and B are partially displayed when the processing for each image data item ends, and hence the user can feel the increased display speed. Thus, the reduction in latency can be achieved.

<Horizontal Division>

Figure 4:
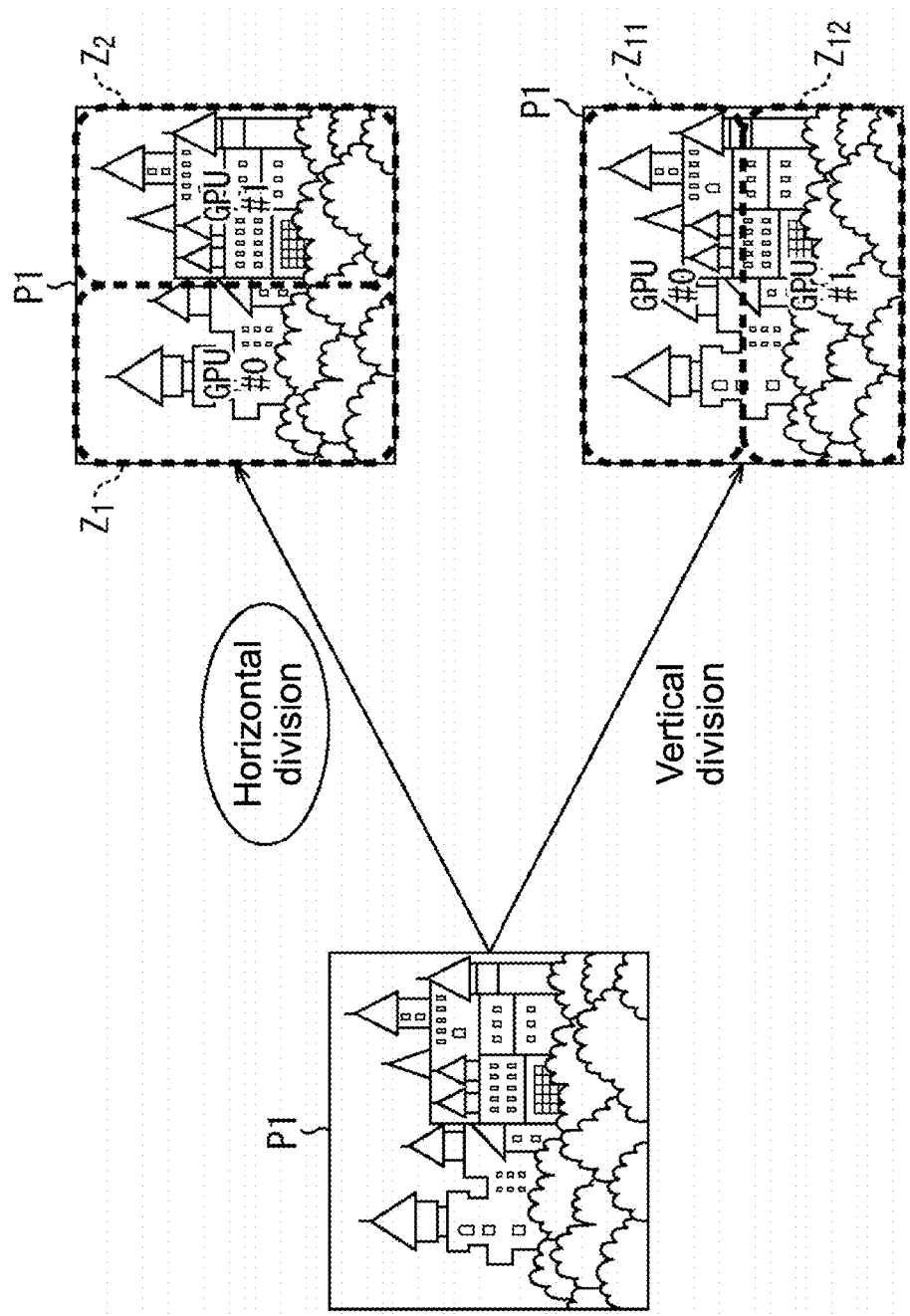
FIG. 4 A diagram describing the image processing apparatus shown in FIG. 1 that divides in a horizontal direction by the number of GPU cards and performs parallel processing.

As described above, the division of the image in the vertical direction realizes the reduction in latency. In addition, due to the provision of the plurality of GPU cards 35 of the image processing apparatus 11 shown in FIG. 1, similar processes are performed in parallel. That is, when image data P1 shown in the left part of FIG. 4 is input, the image data P1 is divided in a horizontal direction as shown in the upper right part of FIG. 4. Each of the divided image data items is subjected to time division processing in the vertical direction as described with reference to FIG. 3.

Note that, in the upper right part of FIG. 4, a region Z1 shown in a left part of the image data P1 is a processing range processed by "GPU #0" corresponding to the GPU card 35-1 and a region Z2 shown in a right part of the image data P1 is a processing range processed by "GPU #1" corresponding to the GPU card 35-2. Note that the lower right part of FIG. 4 shows an example of a vertical division method in conventional parallel processing. Here, an upper stage, which is shown in a region Z11, is a processing range processed by "GPU #0" corresponding to the GPU card 35-1 and a lower stage, which is shown in a region Z12, is a processing range processed by "GPU #1" corresponding to the GPU card 35-2. That is, the lower right part of FIG. 4 shows an example in which the image data is divided into two ranges in the vertical direction for each of the GPU cards 35.

<Vertical Division>

Figure 5:
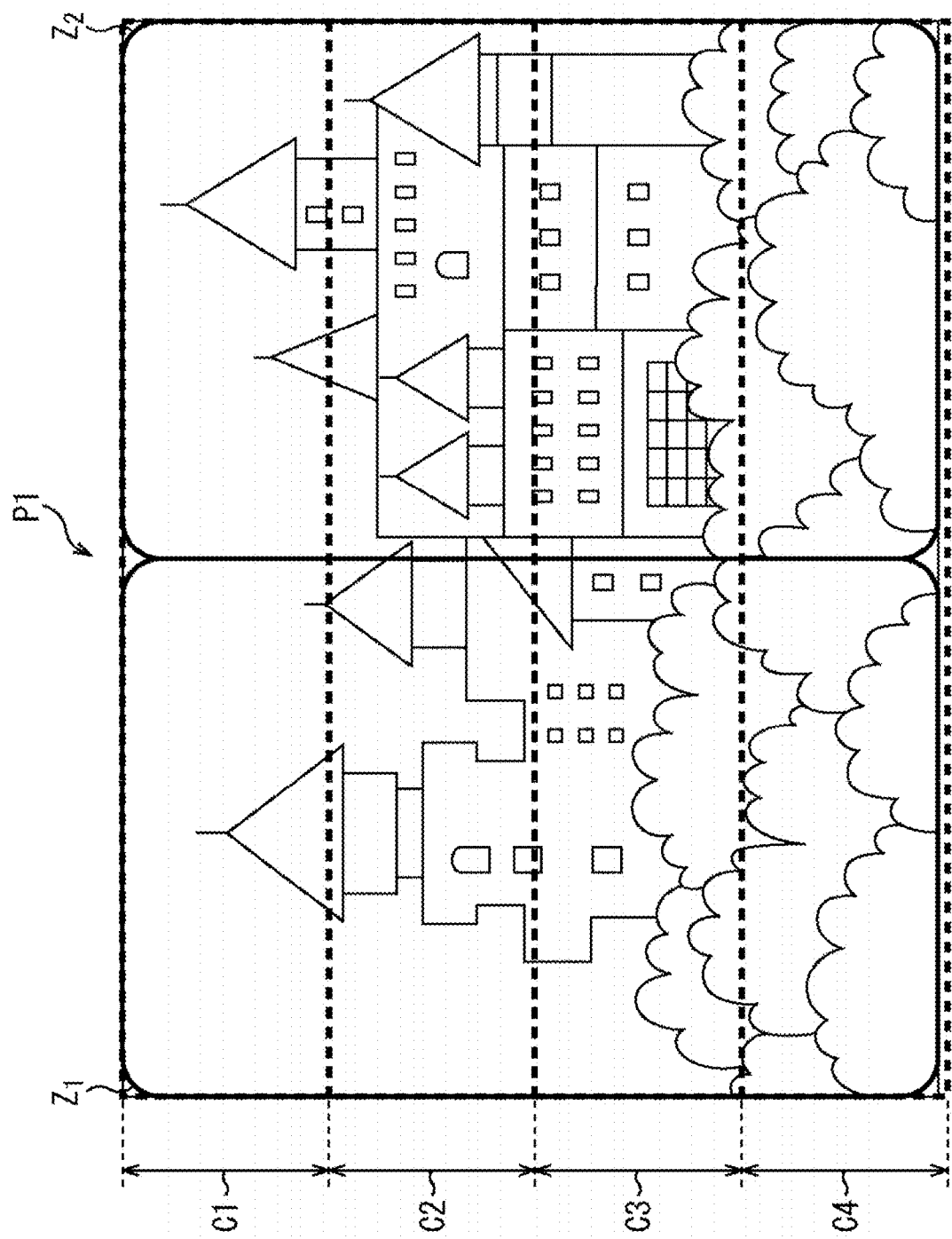
FIG. 5 A diagram describing the image processing apparatus shown in FIG. 1 that divides the image data in the horizontal direction by the number of GPU cards, performs parallel processing, and also performs time division processing in a vertical direction.

Further, as shown in FIG. 5, when each of the regions Z1, Z2 of the image P1 is divided into four ranges C1 to C4 from the top in the vertical direction, the image processing apparatus 11 shown in FIG. 1 controls the GPU card 35-1 to perform time division processing in the order of the ranges C1 to C4 (in sequential order from the top to the bottom) of the region Z1. Similarly, the image processing apparatus 11 shown in FIG. 1 controls the GPU card 35-2 to perform time division processing in the order of the ranges C1 to C4 of the region Z2.

As described above, with respect to the horizontal direction, the processing is performed in parallel by the plurality of (two in FIG. 5) GPU cards 35. In addition, with respect to the vertical direction, the time division processing is performed by the GPU cards 35. Thus, the speed of image processing can be increased and the reduction in latency can be realized.

<Overhead>

It is filtering processing that is generally executed by the processor 92 of the GPU card 35 with respect to an image. For example, a case where it is necessary to process a Gaussian filter as shown in FIG. 6 with respect to each pixel three times will be considered. Note that the Gaussian filter of 3 pixels by 3 pixels is shown in FIG. 6. Here, 4/16 is set to a pixel of interest, 2/16 is set to four pixels located on the upper, lower, left, and right sides of the pixel of interest, and 1/16 is set to four pixels located on the obliquely left, right, upper, and lower sides of the pixel of interest, as weighting factors. The filter computes the sum of products as a pixel.

Figure 7:
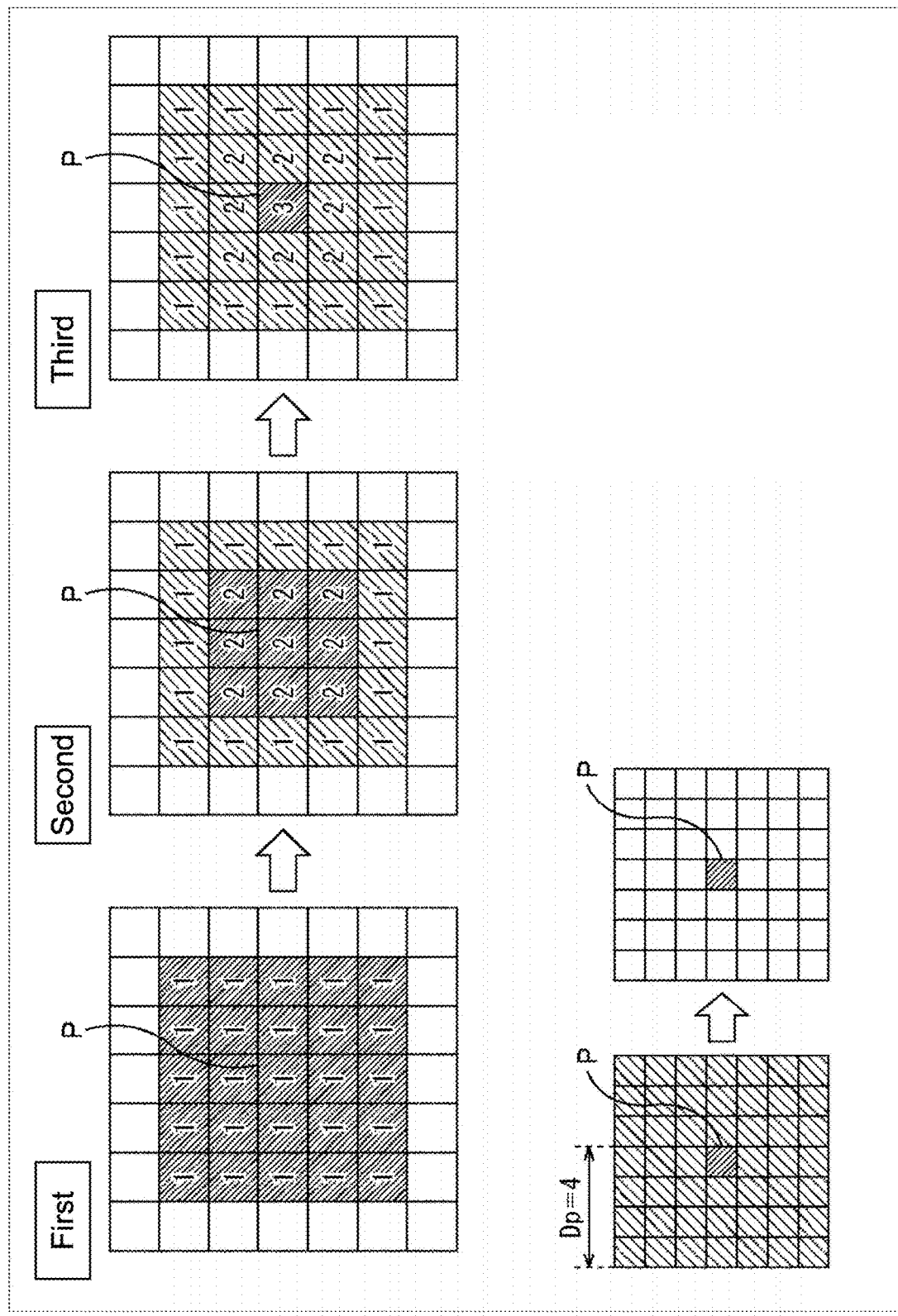
FIG. 7 A diagram describing a relationship between a pixel of interest and reference pixels in filtering processing.

In this case, as shown in the upper left part of FIG. 7, first filtering processing is performed on the range of 5 pixels by 5 pixels with a pixel of interest P being a center. The pixel of interest P is a processing target. In this case, for filtering the pixels positioned at the upper, lower, left, and right end portions of the range of 5 pixels by 5 pixels, pixels directly adjacent to the pixels positioned at the upper, lower, left, and right end portions are also necessary. The adjacent pixels are positioned on an opposite side of the pixel of interest as viewed from the pixels positioned at the upper, lower, left, and right end portions. Further, with respect to each of the pixels positioned at the corners of the range of 5 pixels by 5 pixels, a single pixel obliquely adjacent thereto is also necessary, the single pixel being positioned on an opposite side of the pixel of interest. That is, for performing the first filtering processing on the range of 5 pixels by 5 pixels shown as the squares with "1", 7 pixels by 7 pixels in total with the pixel of interest P in the figure being a center are necessary.

Next, as shown in the upper center part of FIG. 7, second filtering processing is performed on the range of 3 pixels by 3 pixels with the pixel of interest P being a center. Also in this case, filtering the pixels positioned at the upper, lower, left, and right end portions of the range of 3 pixels by 3 pixels, pixels directly adjacent to the pixels positioned at the upper, lower, left, and right end portions are also necessary. The adjacent pixels are positioned on an opposite side of the pixel of interest as viewed from the pixels positioned at the upper, lower, left, and right end portions. Further, with respect to each of the pixels positioned at the corners of the range of 3 pixels by 3 pixels, a single pixel obliquely adjacent thereto is also necessary, the single pixel being positioned on an opposite side of the pixel of interest. That is, 9 pixels in total in the range of 3 pixels by 3 pixels, which are shown by the squares with "2" in the figure, are necessary for the second filtering processing.

Then, as shown in the upper right part of FIG. 7, using the thus determined 8 pixels after the second processing, three filtering processes are performed on the pixel of interest P such that it has "3".

Thus, when the three filtering processes are performed on the pixel of interest P, the three filtering processes can be performed on the pixel of interest P by using the pixels in the range of 7 pixels by 7 pixels, which are indicated by the hatched portion with the pixel of interest P being a center as shown in the lower part of FIG. 7. That is, when the three filtering processes are performed on the pixel of interest, the pixels in the region of 3 pixels by 3 pixels with the pixel of interest being a center are reference pixels in the third processing. Further, in the second processing, with respect to each of the pixels of 3 pixels by 3 pixels, which are the reference pixels in the third processing, 9 pixels with each of 9 pixels being a center are necessary as the reference pixels necessary for the second filtering processing, and hence the range of 5 pixels by 5 pixels is the reference pixels. In addition, in the first processing, with respect to each of the reference pixels in the second processing, the pixels of 5 pixels by 5 pixels are the reference pixels, and hence the range of 7 pixels by 7 pixels is necessary as the reference pixels.

Here, the reference pixels other than the pixel that is the processing target, i.e., the pixel of interest, which are necessary when the pixel of interest is subjected to the processing, or the number of reference pixels will be referred to as overhead. A region in which the reference pixels are present will be referred to as an overhead region. Thus, in the case of FIG. 7, regarding the pixel of interest that is the single pixel, as shown in the lower left part of FIG. 7, a region corresponding to an overhead width Dp=4 pixels on each of the upper, lower, left, and right sides of the pixel of interest is generated as the overhead region. That is, in the case of FIG. 7, 48 pixels excluding the pixel of interest are generated as the pixels that are overhead. It should be noted that pixels of the reference pixels, each of which can otherwise be set as pixels of interest, are not overhead pixels. Only pixels that are not set as processing targets and are required only as reference pixels will be referred to as overhead.

Note that, hereinafter, the overhead width Dp will be employed as a representation for the amount of overhead that occurs with respect to the pixel of interest. The overhead width Dp is the number of pixels up to the end portion on any of the upper, lower, left, and right sides of the pixels that are overhead as viewed from the pixel of interest P as shown in the lower left part FIG. 7. Thus, when the overhead width Dp=4, the number of pixels that are overhead is 48 pixels.

A region in which the pixel that is the processing target is present includes a plurality of pixels. Overhead as shown in FIG. 8, for example, occurs when the image in the single frame is divided into two regions in the horizontal direction and the processors 92-1, 92-2 of the GPU cards 35-1, 35-2 sequentially perform time division processing on them for each of the four ranges divided in the vertical direction as described above.

Figure 8:
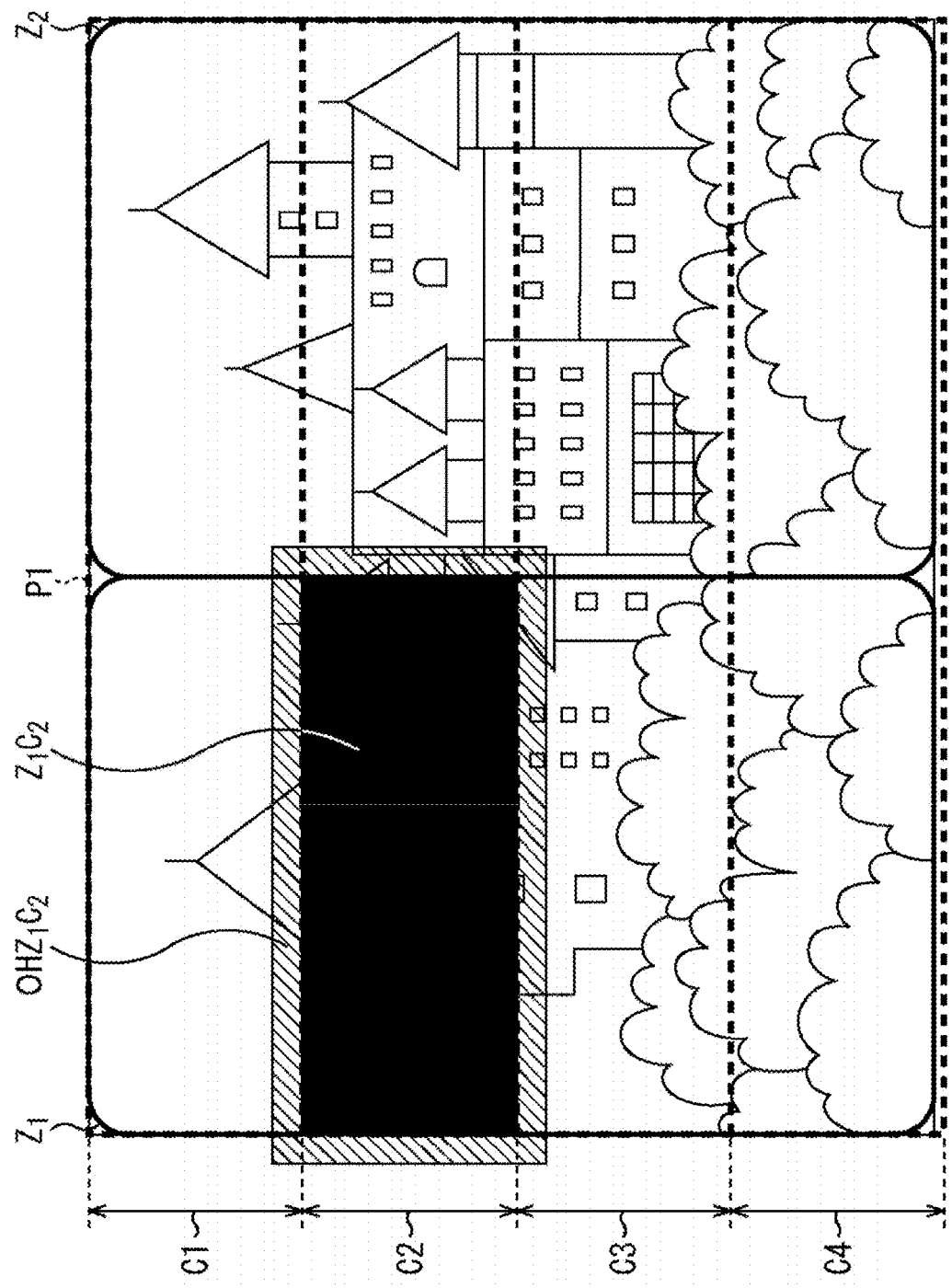
FIG. 8 A diagram describing overhead that occurs when filtering processing is performed on each processing region.

That is, in FIG. 8, with respect to the image P1, an overhead region OHZ1C2 is generated in a region Z1C2 defined by a range C2 at a second stage from the top in the region Z1 on the left side of the figure.

Thus, as shown in FIG. 8, when the image is divided into eight regions in total by dividing each of the regions Z1, Z2 into the four ranges C1 to C4 in the vertical direction, the overhead that is eight times as large as the overhead region OHZ1C2 at a rough estimate occurs.

Further, also regarding overhead in the each region, the example in which the overhead (48 pixels) having the overhead width Dp=4 pixels occurs with respect to one pixel in the case of the above-mentioned filter of 3 pixels by 3 pixels has been described. However, larger overhead occurs in actual processing.

Figure 9:
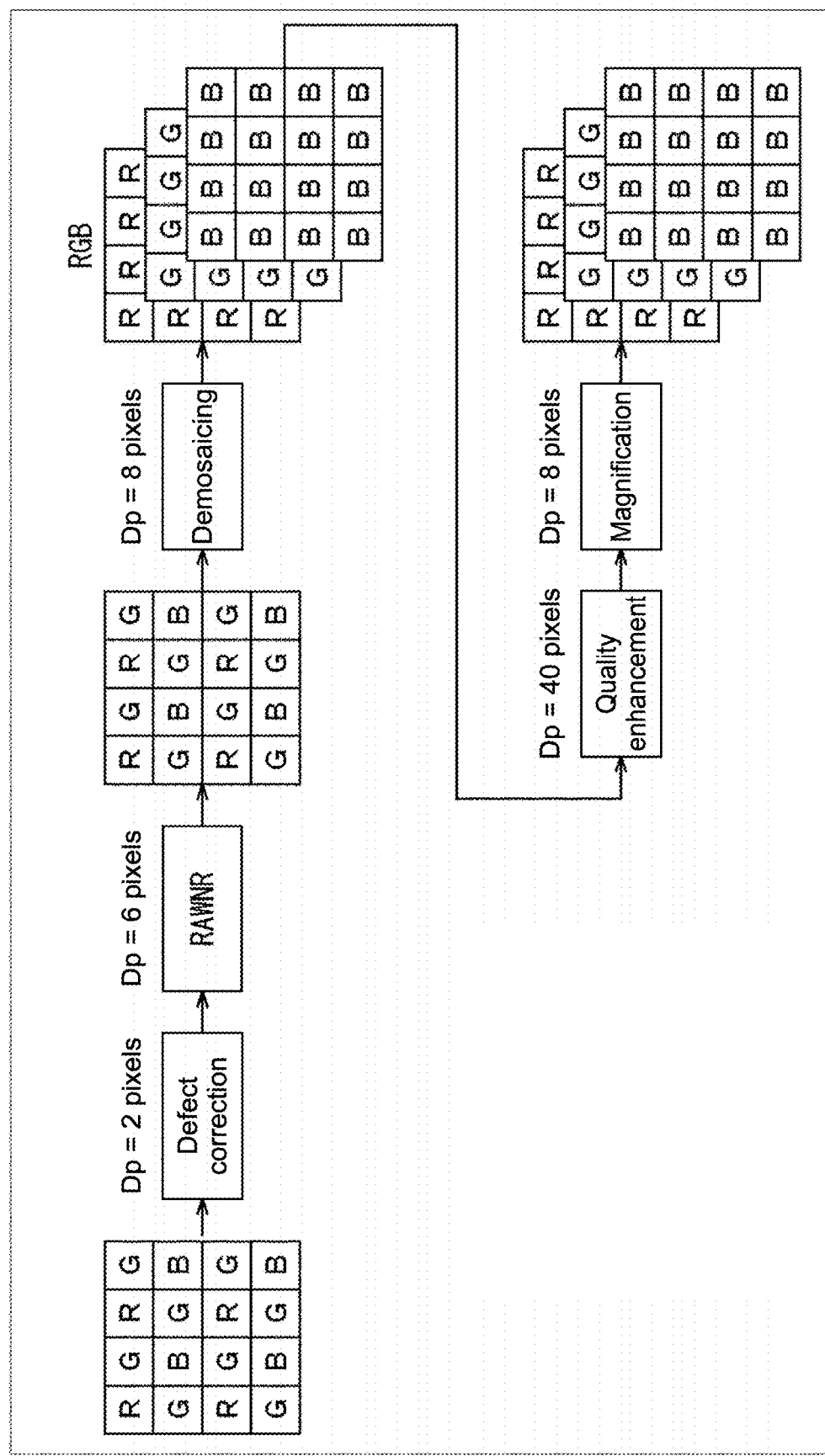
FIG. 9 A diagram describing a specific example of overhead that occurs when filtering processing is performed on each processing region.

For example, assuming that, as shown in FIG. 9, overhead having an overhead width Dp=2, 6, 8, 40, 8 pixels occurs in each of processes including defect correction processing, RAWNR processing, demosaicing processing, quality enhancement processing, and magnification processing, overhead having an overhead width Dp=64 pixels in total occurs. That is, in the range of 129 pixels by 129 pixels, overhead pixels as many as the number of pixels excluding the pixel of interest are generated. Further, for example, when the image is divided into two regions in the horizontal direction and divided into four regions in the vertical direction, the overhead may increase by about 30% in comparison with a case where such division processing is not performed.

<Reduction Method for Overhead>

As described above, the increase in overhead greatly increases the amount of arithmetic processing and the processing time, and hence a processor having a higher computation performance becomes necessary for achieving real-time display. In view of this, in the image processing apparatus 11 shown in FIG. 1, the overhead is reduced by computation as follows. That is, when the regions Z1, Z2 are respectively allocated as the processing regions of the image P1 to the GPU cards 35-1, 35-2, results of filtering processing at a pre-stage are buffered in the memories 93-1, 93-2, such that they can be used for the filtering processing at a post-stage.

Figure 10:
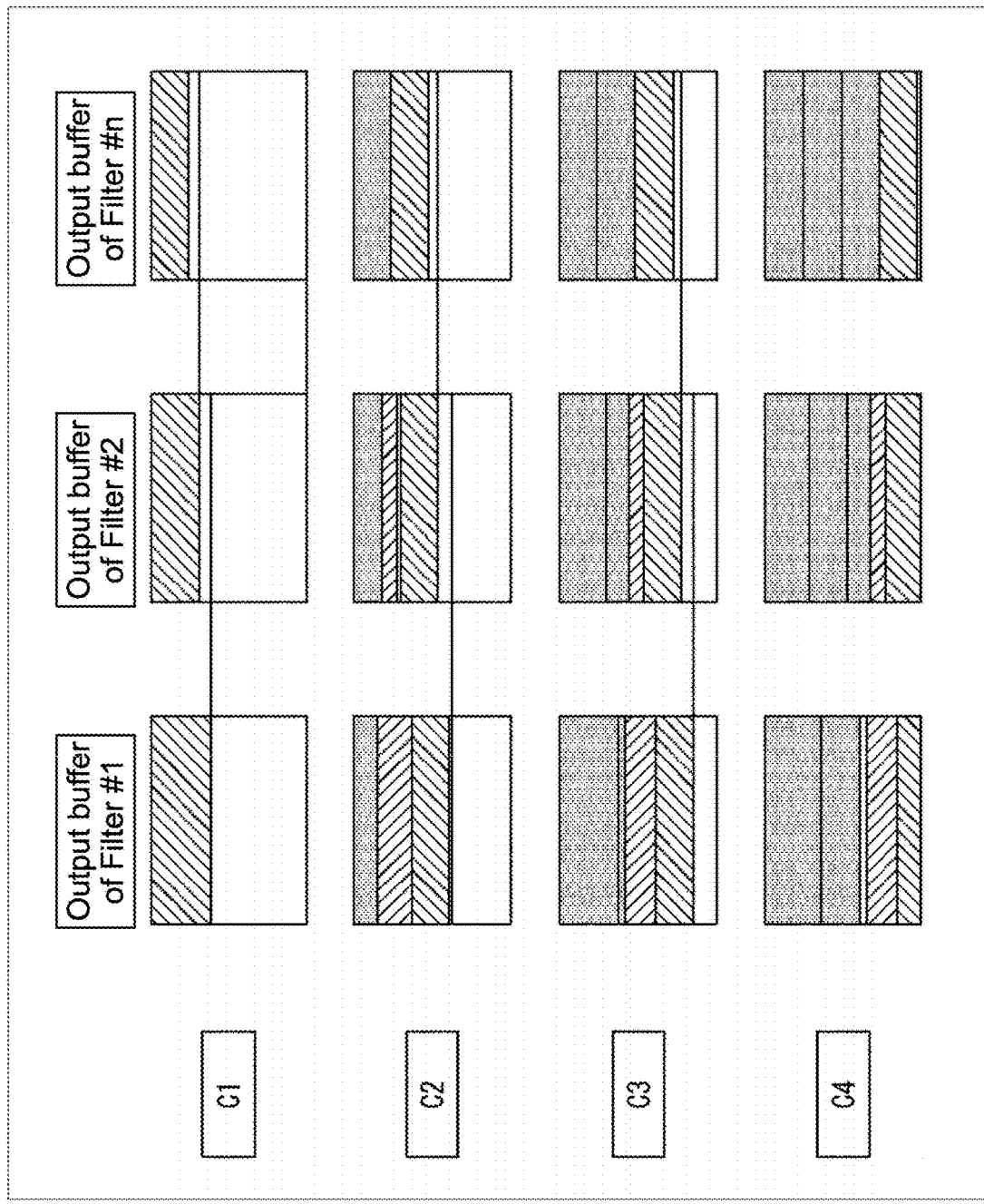
FIG. 10 A diagram describing a method of setting processing ranges in each process of the filtering processing in the image processing apparatus shown in FIG. 1.

That is, when filtering processes at an n-number of stages are necessary as a whole, a range corresponding to the number of lines wider than 1/4 of the total number of lines in the vertical direction is set as a processing region in a range C1 that is processed in first filtering processing (Filter #1), as indicated by the portion with hatched lines upward to the right in the upper left part of FIG. 10. The total number of lines corresponds to the single frame and includes the number of lines in which all the reference pixels necessary for the subsequent processing are present. Subsequently, each of ranges C2, C3 is set to be equivalent to a range corresponding to ¼ of the total number of lines. The remaining range is set as the last range C4. Note that FIG. 10 shows a processing range applied to the whole of the image P1 when the ranges C1 to C4 are sequentially processed in sequential order from the top in the case where the first filtering processing (Filter #1), second filtering processing (Filter ∩2), and nth filtering processing (Filter #n) from the left are performed.

With this, by a result of processing of the range C1 being buffered in the memories 93, the region in which the necessary reference pixels are present is processed in the range C1 in advance as indicated by the portion with hatched lines upward to the left. Therefore, for the processing of the range C2, it is only necessary to refer to it. Thus, no overhead occurs. Further, the range of the number of lines wider than ¼ of the total number of lines is set as the range C1, and hence the position of the range C2 is the position of the range corresponding to ¼ of the total number of lines that is closer to the range C3 in comparison with the original position of the range C2. With this, a region of the range C3, in which the reference pixels are present, is buffered as a result of processing of the range C2, and hence it is unnecessary to perform the filtering processing again. Thus, the occurrence of the overhead is suppressed.

Similarly, the position of the range C3 is the position of the range corresponding to ¼ of the total number of lines that is closer to the range C4 in comparison with the original position of the range C3. Therefore, as indicated by the portion with hatched lines upward to the left, a region of the range C4, in which the reference pixels are present, is buffered as a result of processing of the range C3, and hence it is unnecessary to perform the filtering processing again. Thus, the occurrence of the overhead is suppressed.

Further, as indicated by the portion with hatched lines upward to the right in the upper center part of FIG. 10, a range wider than ¼ of the total number of lines including the reference pixels for the subsequent processing is set as a processing region in the range C1 that is processed by the second filtering processing (Filter #2). The range is narrower than a range corresponding to the number of lines of the first filtering processing (Filter #1), which is indicated by the portion with hatched lines upward to the right in the upper left part of FIG. 10. Subsequently, each of ranges C2, C3 is set to be equivalent to a range corresponding to ¼. The remaining range is set as the last range C4.

That is, regarding the number of lines of the range C1 in the second filtering processing (Filter #2), the region in which the reference pixels are present is also narrower, corresponding to the smaller number of filters at the post-stage in comparison with the first filtering processing (Filter #1). Therefore, as indicated by the portion with hatched lines upward to the right in the upper center part of FIG. 10, the range is wider than ¼ of the total number of lines and narrower than the range C1 for the first filtering processing (Filter #1).

As a result, also regarding the ranges C2, C3, each of them is set displaced to be closer to the position at which the original range corresponding to ¼ of the total number of lines. The range C4 is wider, corresponding to the smaller number of lines of the range C1 in comparison with the range C1 in the first filtering processing (Filter #1).

Thereafter, as the number of remaining filters decreases, the number of lines of the range C1 becomes closer to the number of lines corresponding to ¼ of the total number of lines and each of the positions of the ranges C2, C3 becomes closer to the original position of ¼ of the total number of lines. Then, regarding the last, nth filtering processing (Filter #n), it is unnecessary to consider the reference pixels for the filter at the post-stage. Thus, as shown in the right part of FIG. 10, each of the ranges C1 to C4 is at the original position of the number of lines corresponding to ¼ of the total number of lines.

As described above, with respect to the lines in the range in which the reference pixels necessary for the filtering processing at the post-stage are present, the filtering processing is performed in the filtering processing at the pre-stage in advance, the result of processing is buffered, and the result of processing is used for the filtering processing at the post-stage. Thus, the occurrence of the overhead can be suppressed.

<Low-Latency Display Processing>

Figure 11:
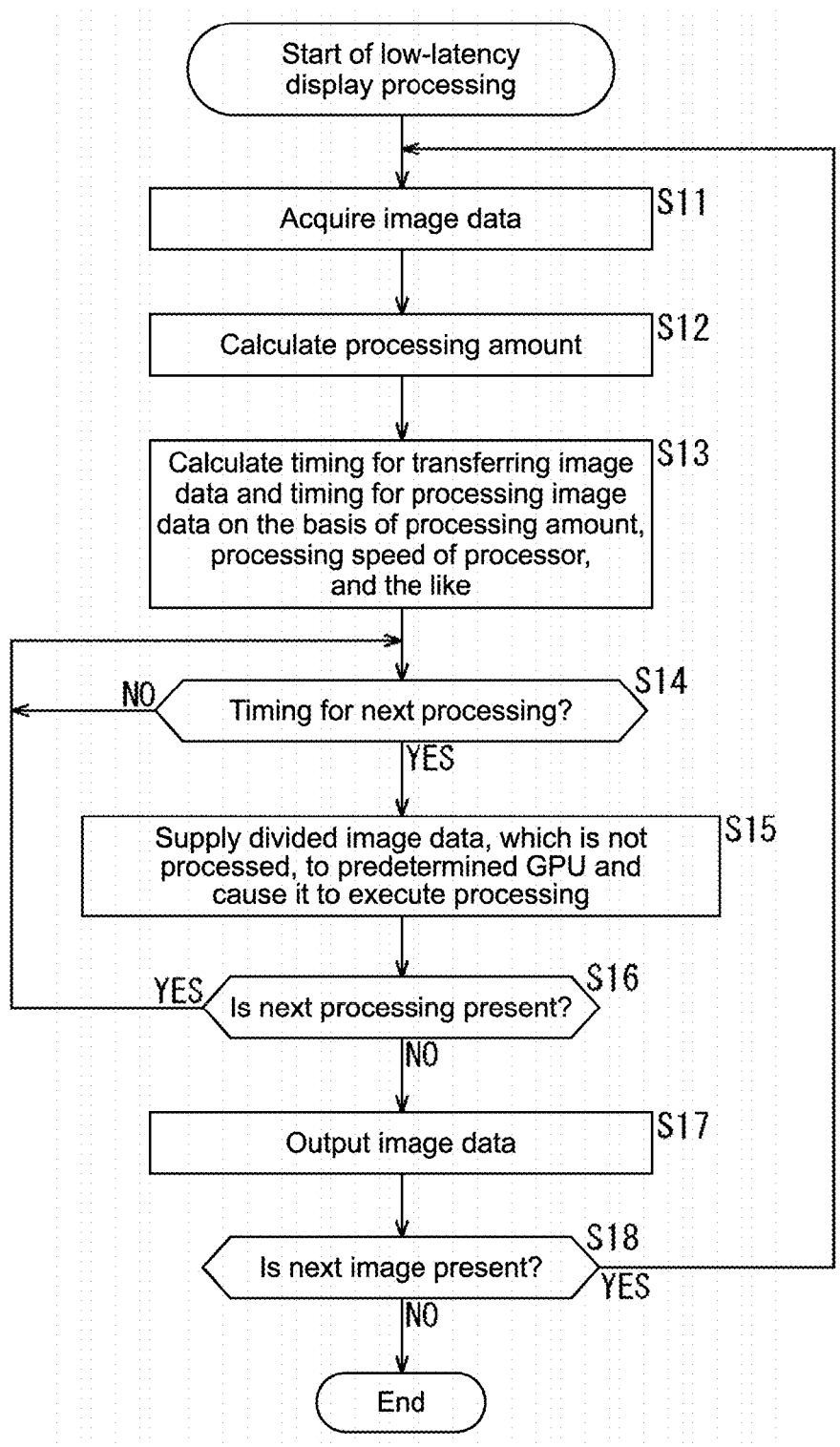
FIG. 11 A flowchart describing low-latency display processing performed by the image processing apparatus shown in FIG. 1.

Next, referring to a flowchart shown in FIG. 11, low-latency display processing performed by the image processing apparatus 11 shown in FIG. 1 will be described.

In Step S11, the camera IF 71 of the IF card 34 receives input of image data captured by the camera (not shown) and supplies the image data to the CPU 51 via the PCIe bridge 73 and the bus 33. The CPU 51 stores the supplied and input image data in the main memory 32.

In Step S12, on the basis of the image data stored in the main memory 32, the DMA controller 51 divides the image in the horizontal direction in a manner that depends on the number of GPU cards 35. Further, the DMA controller 51 calculates the amount of processing on the basis of information on the number of ranges when the divided regions are divided in the vertical direction by the number of divisions for time division processing, and the number of filters associated with the processing, and a region in which reference pixels therefor are present.

That is, the amount of processing is roughly classified into two kinds, i.e., the amount of processing associated with the processing in the vertical direction and the amount of processing associated with the processing in the horizontal direction. The DMA controller 51 calculates and sums them.

<Amount of Processing in Vertical Direction>

That is, with respect to the vertical direction, with an output buffer size that is DMA-output after the image data is finally stored in the main memory 32 being a reference, the amount of processing is sequentially determined on the basis of the number of reference pixels and processing unit blocks in each of the filtering processes from the process that is the first filtering processing #1 (Filter #1) to the process that is the nth filtering processing (Filter #n). The sequential determination is performed in an order opposite to the processing order.

Figure 12:
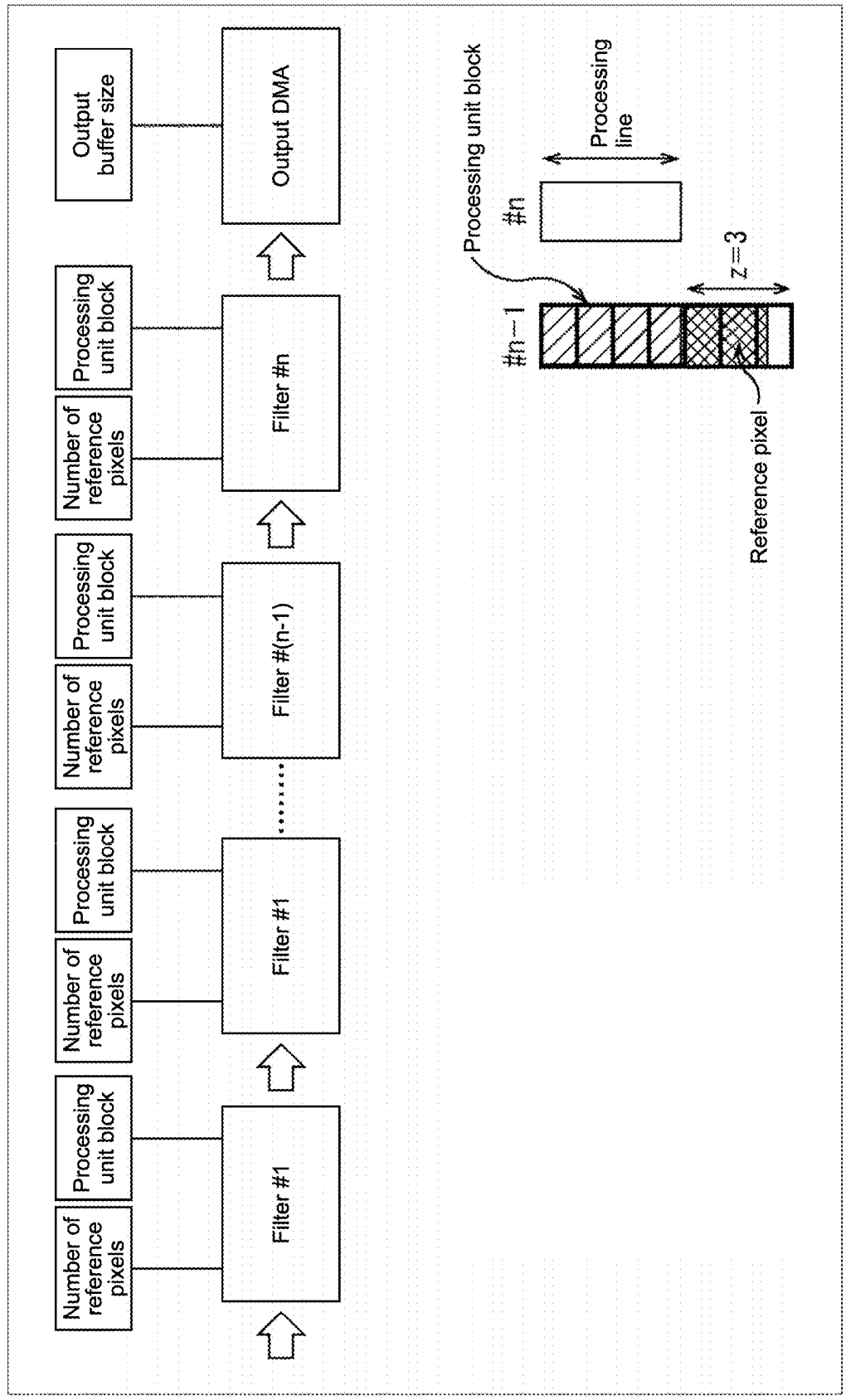
FIG. 12 A diagram describing a method of calculating the amount of processing in the horizontal direction.

That is, as shown in FIG. 12, in the case of normal filtering processing sequentially performed in the vertical direction, a result of processing obtained in the first filtering processing (Filter #1) is processed by the second filter (Filter #2), further processed by third filtering processing (Filter #3), for example. Such filtering processes are repeated. The nth filtering processing is finally performed. Then, the result of processing is DMA-transferred and output (output DMA in the upper right-most part in the figure).

Thus, from the number of lines of the output DMA, the amount of processing in the vertical direction is sequentially calculated in the opposite direction on the basis of the number of reference pixels and the processing unit blocks in each filtering process. That is, for example, assuming that the number of lines that is the output buffer size is PY(DMA), the number of lines determined by the nth filtering processing (Filter #n) is predetermined by the number of pixels that constitute the image. Therefore, for example, the number of lines PY(n)=PY(DMA).

In this case, the number of lines PY(n−1) of (n−1)th filtering processing (Filter #(n−1)) is calculated according to Expression (1) as follows.

$$PY(n-1)=PY(n)+BY(n-1)*z \quad (1)$$

Where PY(n−1) denotes the number of lines of the (n−1)th filtering processing (Filter #(n−1)), PY(n) denotes the number of lines of the nth filtering processing (Filter #n), and BY(n−1) denotes the number of lines indicating a processing unit block size in the (n−1)th filtering processing (Filter #(n−1)).

Further, z is a value such that BY(n−1)*A is larger than the number of reference pixels and A is minimum.

That is, as shown in the lower right part of FIG. 12, a case where, with respect to the number of lines (number of lines to be processed) output after the nth filtering processing (Filter #n), the number of lines that constitute the reference pixels in the (n−1)th filtering processing (Filter #(n−1)) corresponds to the grid-pattern area.

Here, the number of lines to be processed in the nth filtering processing (Filter #n) is equivalent to four blocks, each of which is a processing unit block formed of a predetermined number of lines. The four blocks are indicated by the portion with hatched lines upward to the left in the lower right part of FIG. 12. Further, as shown as the grid-pattern area in the lower right part of FIG. 12, the reference pixels in the (n−1)th filtering processing (Filter #(n−1)) correspond to a range equivalent to two blocks and a part of a single block. The part of the single block is equivalent to several lines.

By the way, each filtering process can be performed only on each processing unit block formed of the predetermined number of lines. In view of this, in the case as shown in the lower right part of FIG. 12, also the portion formed of the number of lines equivalent to the part of the single block is considered as being equivalent to the single block. With this, in the lower right part of FIG. 12, z indicated in Expression (1) is calculated as 3.

Therefore, in the case of the lower right part of FIG. 12, the number of lines equivalent to seven blocks are substantially determined as the number of lines to be processed in the (n−1)th filtering processing (Filter #(n−1)).

Thereafter, the number of processing unit blocks up to the first filtering processing (Filter #1) is calculated, the amount of processing corresponding to the number of processing unit blocks is sequentially calculated, and a total sum thereof is calculated as the amount of processing in the vertical direction.

Note that, also here, as the number of lines necessary for each filtering process, the number of lines including the reference pixels necessary for the post-stage in each filter is set such that the overhead is reduced as described with reference to FIG. 10.

<Amount of Processing in Horizontal Direction>

Also regarding the amount of processing in the horizontal direction, with an output buffer size that is DMA-output after the image data is finally stored in the main memory 32 being a reference, the amount of processing is sequentially determined on the basis of the number of reference pixels and the processing unit blocks in each of the filtering processes from the first filtering processing #1 (Filter #1) to the nth filtering processing (Filter #n). The sequential determination is performed in the order opposite to the processing order.

Figure 13:
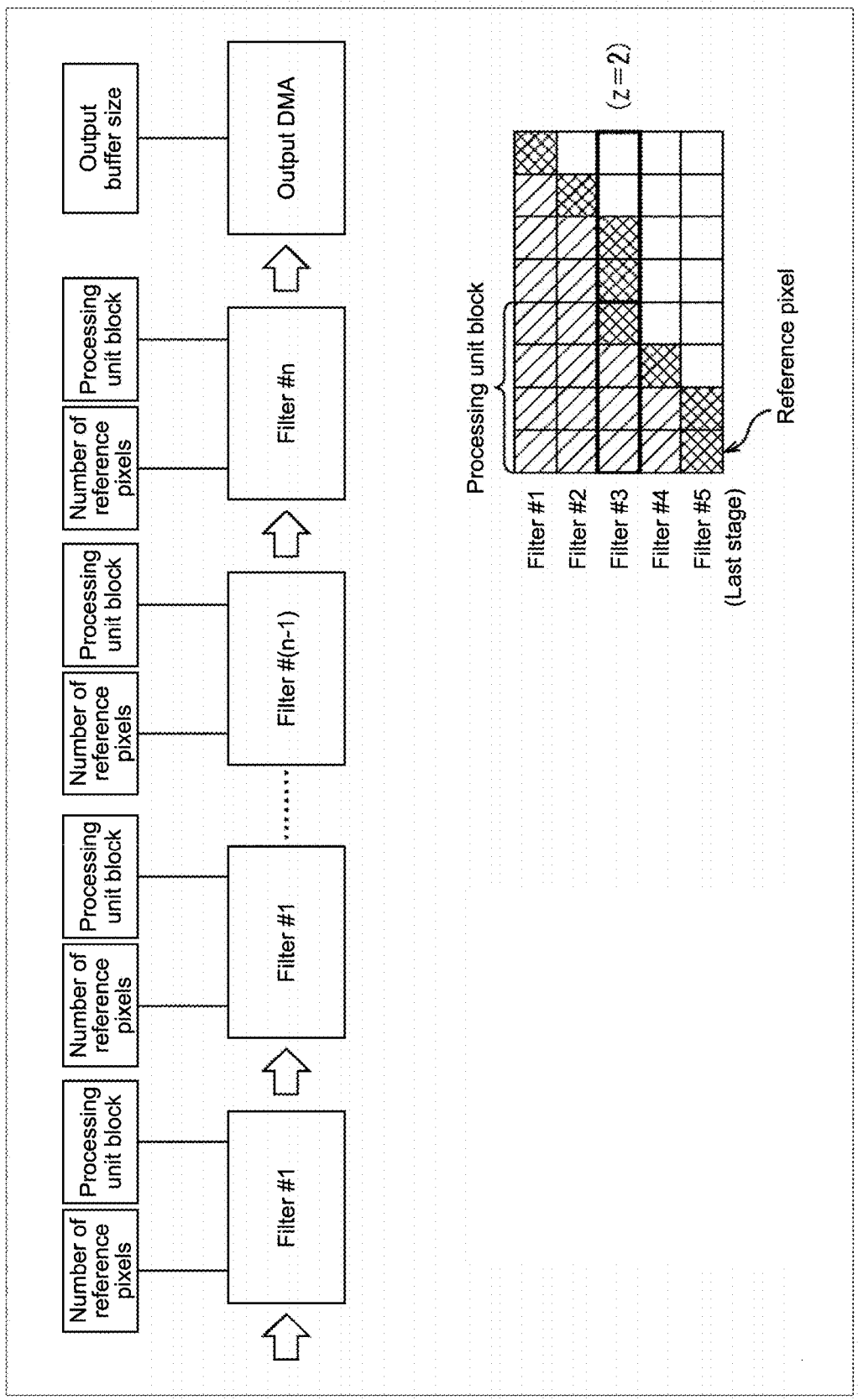
FIG. 13 A diagram describing a method of calculating the amount of processing in the vertical direction.

That is, as shown in FIG. 13, in the case of normal filtering processing sequentially performed in the horizontal direction, a result of processing obtained in the first filtering processing (Filter #1) is processed by the second filtering processing (Filter #2), further processed by the third filtering processing (Filter #3), for example. Such processes are repeated. The nth filtering processing (Filter #n) is finally performed. Then, the result of processing is DMA-transferred and output (output DMA in the figure).

Thus, from a horizontal width defined by a multiple of the processing unit block of the output DMA, the amount of processing in the horizontal direction is sequentially calculated in the opposite direction on the basis of the number of reference pixels and the processing unit blocks in each filtering process. It should be noted that, the processing of reducing the overhead, which is performed in the processing in the vertical direction, is not performed in the processing in the horizontal direction, and hence the amount of processing corresponds to the horizontal width obtained by simply adding, to the horizontal width in each filtering process, the width equivalent to the number of processing unit blocks depending on the number of reference pixels in each filtering process is obtained.

That is, a horizontal width Xk necessary for calculating the amount of processing in kth filtering processing #k, for example, is expressed by Expression (2) as follows.

$$Xk = w + zk * xk \quad (2)$$

Where Xk denotes a width necessary for calculating the amount of processing in the kth filtering processing #k, w denotes a horizontal width set according to a multiple of the processing unit block in nth filtering processing #n, and zx denotes the width of the processing unit block.

Further, zk is a value such that, assuming that the number of reference pixels of ith filtering processing (Filter #i) is ri, it is larger than a total sum (r1+r2+ . . . +r(k−1)+rk) of the number of reference pixels in the previous filtering processes and zk*xk is minimum.

That is, it is assumed that, with respect to a horizontal width output after the nth filtering processing (Filter #n (n=1 to 6: n=6 is final stage)), with respect to a width in sixth filtering processing (Filter #6) corresponding to the nth filtering processing (Filter #n), which is an output buffer size, the number of reference pixels in fifth filtering processing (Filter #5) is 2 as indicated by the grid-pattern squares at the lowermost stage of the lower right part of FIG. 13.

Then, it is assumed that the number of reference pixels is 1 in fourth filtering processing (Filter #4) as indicated by the grid-pattern square at the second stage from the bottom of the lower right part of FIG. 13. In this case, as indicated by the squares in the portion with hatched lines upward to the left in the fifth filtering processing (Filter #5), 2 that is the number of reference pixels is added. As a result, the number of reference pixels is 3.

Similarly, it is assumed that the number of reference pixels is 3 in the third filtering processing (Filter #3) as indicated by the grid-pattern squares at the third stage from the bottom of the lower right part of FIG. 13. In this case, as indicated by the square of the portion with hatched lines upward to the left, 3 that is the number of reference pixels up to the fourth filtering processing (Filter #4) is added. As a result, the number of reference pixels is 6.

In addition, it is assumed that the number of reference pixels is 1 in the second filtering processing (Filter #2) as shown at the fourth stage from the bottom of the lower right part of FIG. 13. In this case, as indicated by the square of the portion with hatched lines upward to the left, 6 that is the number of reference pixels up to the third filtering processing (Filter #3) is added. As a result, the number of reference pixels is 7.

Then, it is assumed that the number of reference pixels is 1 in the first filtering processing (Filter #1) as shown at the top stage in the lower right part of FIG. 13. In this case, as indicated by the squares of the portion with hatched lines upward to the left, 7 that is the number of reference pixels up to the second filtering processing (Filter #2) is added. As a result, the number of reference pixels is 8.

That is, in this case, for example, when the processing unit block is constituted of one pixel as shown in the third stage from the bottom of the lower right part of FIG. 13, zk (=z3) of Expression (2) above in the third filtering processing (Filter #3) equals 2.

In accordance with the above-mentioned method, the amount of processing is sequentially determined. The amount of processing corresponds to a result of addition of the horizontal widths in the filters. Each of the widths is a multiple of the processing unit block that is a processing target.

The DMA controller 51 calculates the amount of processing in the vertical direction and the amount of processing in the horizontal direction described above in a manner that depends on the number of divisions of the image in the horizontal direction and the number of divisions of the image in the vertical direction. The DMA controller 51 calculates the amount of processing necessary for the processing by summing both.

In Step 13, the DMA controller 51 calculates processing times for various types of filtering processing in a manner that depends on the processing capabilities of the processors 92 respectively installed in the GPU cards 35 and the amount of processing resulting from the above-mentioned calculation. In addition, on the basis of the determined processing times, the DMA controller 51 calculates various timings such as a timing for reading out the image data and a timing for transferring the image data. With this processing, a timing chart is structured. The timing chart indicates a transfer timing, a transfer target, and a transfer destination when any of image data items is transferred to either one of the GPU cards 35.

In Step S14, the DMA controller 51 starts processing at a predetermined timing on the basis of this timing chart, and determines whether or not it is a timing for next processing, and repeats similar processing until the timing for the next processing comes.

In Step S14, for example, when it is determined that it is the timing for starting the next processing, the processing proceeds to Step S15.

In Step S15, on the basis of the timing chart, the DMA controller 51 reads out image data, which is set for the next processing, from the main memory 32, and transfers it to the GPU card 35 set as a transfer destination and causes the processor 92 of the GPU card 35 to execute the processing at the same time. Or, when the processing by the processor 92 of the GPU card 35 is executed and a result of processing is sent, the DMA controller 51 receives it and stores it in the main memory 32.

In Step S16, the DMA controller 51 refers to the timing chart and determines whether or not next processing is present. For example, when the next processing is present, the processing returns to Step S14 and the subsequent processing is repeated.

That is, in Step S16, the processing of Steps S14 to S16 is repeated until it is determined that the next processing is not present. Then, when the processing of Steps S14 to S16 is repeated and all the processes set in the timing chart are completed, it is considered in Step S16 that the next processing is not present, and the processing proceeds to Step S17.

In Step S17, under the control of the DMA controller 51, the image data subjected to processing such as quality enhancement and stored in the main memory 32 is output by the display (not shown) via the bus 33 and the PCIe bridge 73 of the IF card 34 through the display IF 72.

In Step S18, the DMA controller 51 determines whether or not a next image has been supplied. When the next image is present, the processing returns to Step S11 and the subsequent processing is repeated.

Then, in Step S18, it is determined that the next image has not been supplied, the processing ends.

That is, as described above, the image is divided in the horizontal direction by the processors 92 of the plurality of GPU cards 35 and distributed to and processed by the processors 92. Further, the image is divided by each of the processors 92 into a predetermined number of ranges in the vertical direction and the divided ranges are subjected to time division processing. Further, in the time division processing, the range in which the reference pixels are present in the filtering processing at the post-stage is executed in the filtering processing at the pre-stage and is buffered in the memory 93.

With this, it is possible to execute processing by the processors 92 of the plurality of GPU cards 35 in parallel. For example, the parallel processing as shown in the lower stage of FIG. 3 is possible. Further, when the time division processing is performed in the vertical direction, the processing efficiency of the processors 92 is enhanced such that overhead, for example, repeated re-calculation of reference pixels is reduced.

Consequently, the speed for enhancing the quality and displaying the image data increases and the reduction in latency can be achieved.

<Equalization of Processing Times>

In accordance with the processing as described above, the times for various types of processing may be changed due to a trade-off of the reduction in overhead in the filtering processing in the vertical direction.

Figure 14:
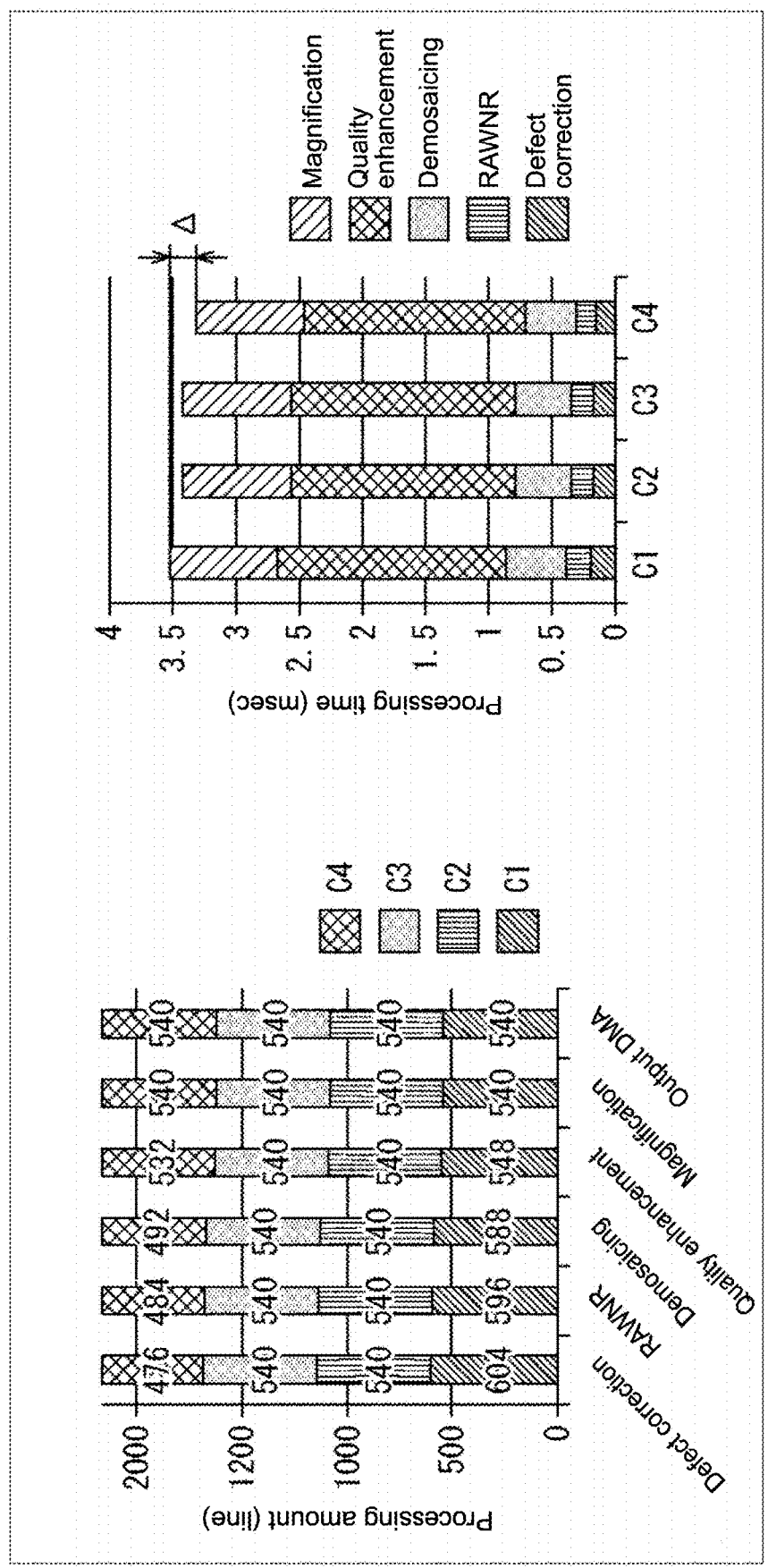
FIG. 14 A diagram describing the fact that processing times depend on the processing ranges.

That is, the left part of FIG. 14 shows an example of the number of lines that is set in each of the ranges C1 to C4 when the reference pixels in the filtering processing at the post-stage are buffered in the filtering processing at the pre-stage such that the overhead is reduced when various types of processing such as defect correction, RAWNR, demosaicing, quality enhancement, magnification, and output DMA are performed.

As shown in the left part of FIG. 14, the number of lines in the ranges C1 to C4 in the defect correction processing is 604, 540, 540, and 476 lines, the number of lines in the ranges C1 to C4 in the RAWNR processing is 596, 540, 540, and 484 lines, and the number of lines in the ranges C1 to C4 in the demosaicing processing is 588, 540, 540, and 492 lines. Further, as shown in the figure, the number of lines in the ranges C1 to C4 in the quality enhancement processing is 548, 540, 540, and 532 lines, the number of lines of the ranges C1 to C4 in the magnification processing is 540, 540, 540, and 540 lines, and the number of lines in the ranges C1 to C4 in the output DMA processing is 540, 540, 540, and 540 lines.

In this case, the processing times in the ranges C1 to C4 are as shown in the right part of FIG. 14. A largest difference 4 in the sum of the processing times in the ranges C1 to C4 is a processing time difference between the ranges C1 and C4, for example, which is a time equivalent to about 5% of the processing time in the range C1. It results from the change in the number of lines to be processed for reducing the overhead in the filtering processing in the vertical direction and is caused due to the change in times of various types of processing. Note that the right part of FIG. 14 shows a total sum of the processing times of each of the ranges C1 to C4 from the left and classification thereof.

For overcoming such variations in processing time, it is conceivable to adjust the number of lines finally output in the ranges C1 to C4, to thereby equalize the processing times, for example.

Figure 15:
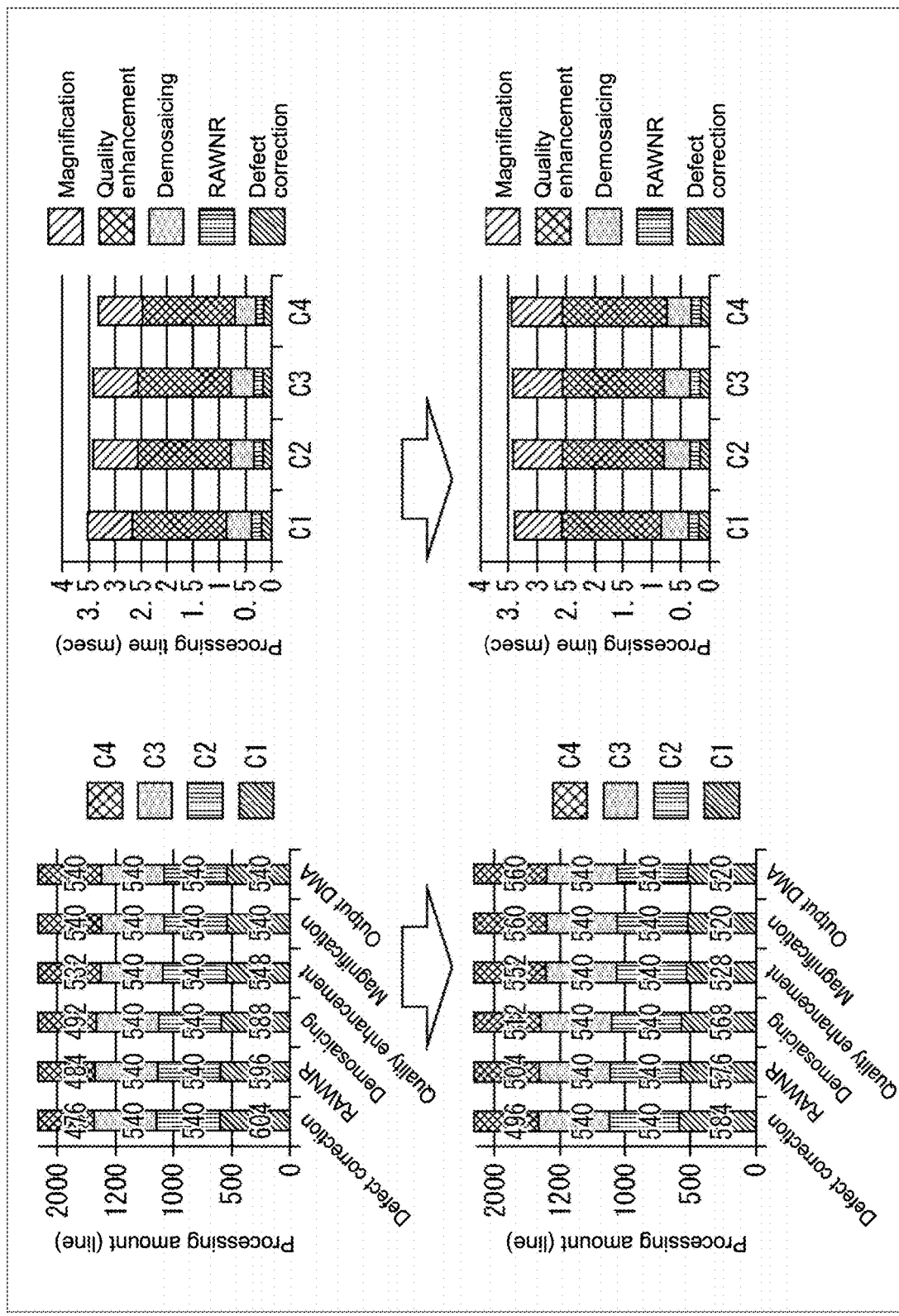
FIG. 15 A diagram describing adjustment of the number of lines output in the processing range for equalizing processing times in processing range.

Specifically, for overcoming the variations in processing time, different number of lines are set as the number of lines in the output DMA processing, as shown in the lower left part of FIG. 15, for example. For example, 520 lines are set in the range C1 and 560 lines are set in the range C4.

With this, as shown in the lower right part of FIG. 15, the processing time difference Δ between the ranges C1 and C4 is overcome and almost zero. Thus, the processing times can be smoothed and equalized as a whole. Note that the upper left part and the upper right part of FIG. 15 are respectively identical to the left part and the right part of FIG. 14.

Figure 16:
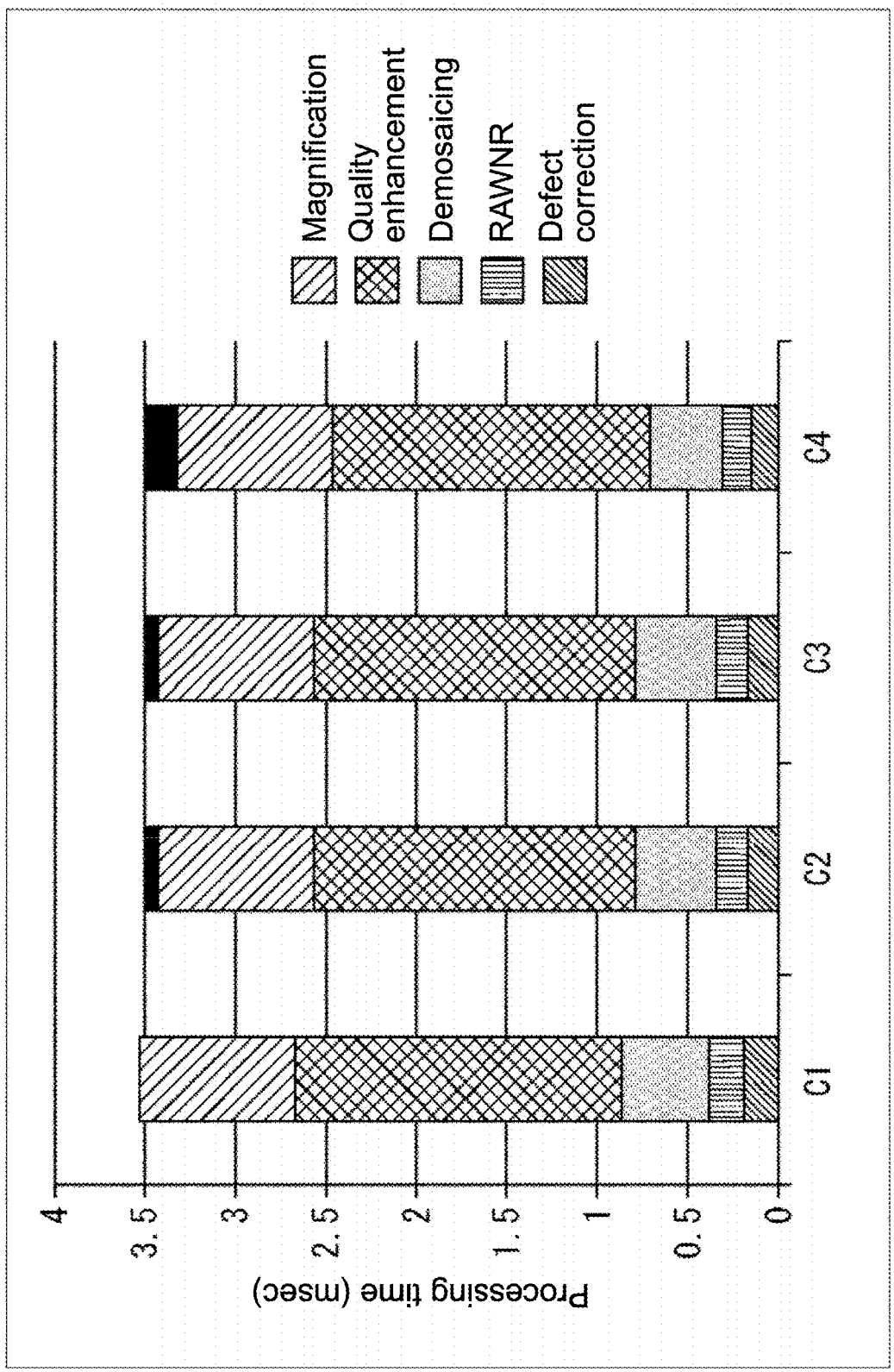
FIG. 16 A diagram describing execution of processing, which is not needed to be performed in real time, in spare time for equalizing the processing times in the processing ranges when a processing time difference between the processing ranges occurs.

Further, for example, processing the processing speed of which is not needed to be adjusted in real time may be allocated to ranges of the ranges C1 to C4, each of which has a shorter processing time. For example, by allocating wave detection processing or the like to a time zone shown by the black range at the top of each of the ranges C2 to C4 as shown in FIG. 16, the processing times may be equalized as a whole.

In accordance with the processing as described above, the image is divided in the horizontal direction and allocated to the plurality of processors. The regions divided in the horizontal direction are subjected to time division processing in the vertical direction. Regarding the ranges divided in the vertical direction, the range including the reference pixels necessary for the processing at the post-stage is set as a leading range. Then, in the processing with respect to the leading range, the filtering processing including processing the reference pixels is performed and a result of processing is buffered in advance. In the subsequent filtering processing, the processing is executed by referring to the buffered result of processing. With this, it becomes possible to realize display processing for a captured image with low latency and to display the captured image at high speed at a timing closer to the real time at which the image is captured.

Therefore, the image processing apparatus 11 shown in FIG. 1 is applicable to an image processing apparatus that processes an image obtained by capturing a surgical site of a patient by an endoscope used in endoscopic surgery, a microscope used in neurological surgery and the like, or the like. The endoscope and the microscope each serve as an imaging apparatus that captures a surgical site of a patient, for example. The image processing apparatus 11 shown in FIG. 1 is also applicable to a surgical system including the endoscope or microscope serving as the imaging apparatus. Further, when the processors 92 in the GPU cards 35 are used, it is less necessary to consider a time lag and the like in displaying the image. Thus, programmability can be enhanced. In addition, also when an image received via broadcasting waves is displayed, the reduction in latency can be achieved. Thus, the image can be displayed with a reduced time lag.

In addition, for processing the image, the DMA controller 51 calculates, in advance, the amount of processing on the basis of the number of reference pixels and the processing unit blocks depending on the filters used for the processing and optimizes the timing for reading out the image data and the timing of writing the image data before the processing is executed. Thus, the reduction in latency can be achieved in an optimal state irrespective of the contents of processing.

By the way, the above-mentioned series of processing may be executed by hardware or may be executed by software. When the series of processing is executed by software, programs that configure the software is installed from a recording medium into a computer incorporated in dedicated hardware or, for example, a general-purpose personal computer. The general-purpose personal computer is capable of executing various functions by installing various programs.

Figure 17:
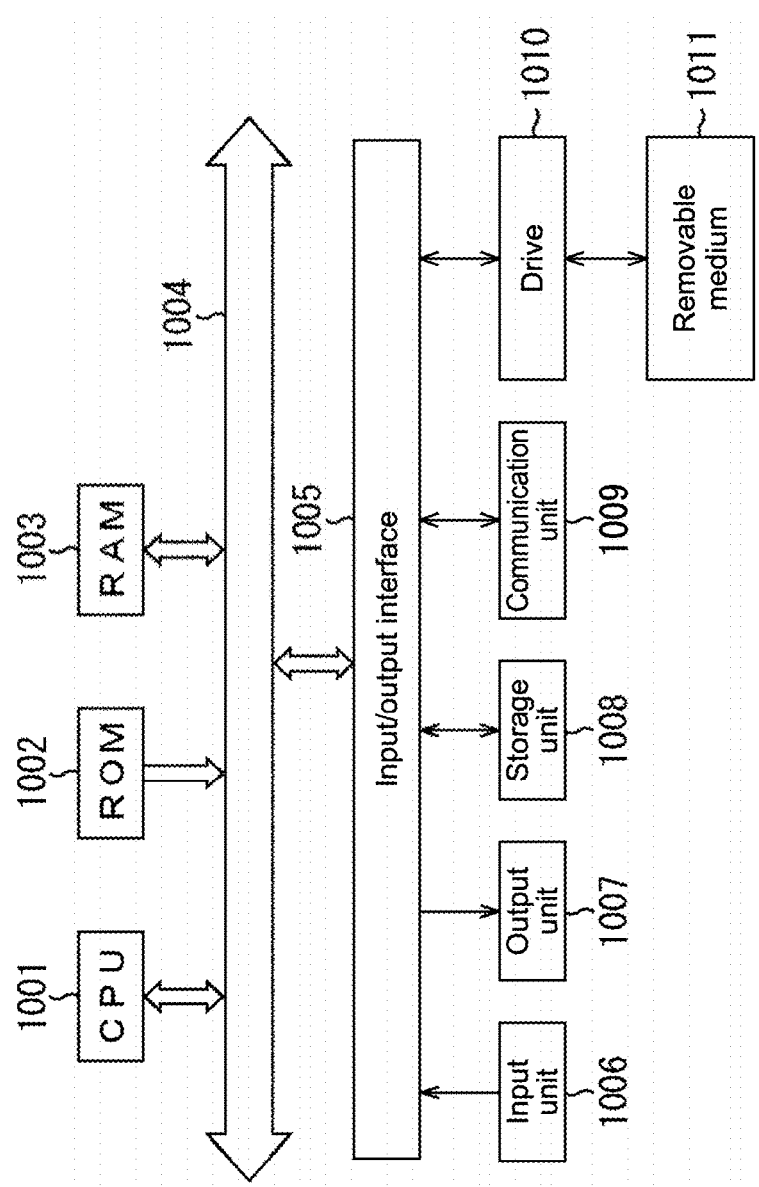
FIG. 17 A diagram describing a configuration example of a general-purpose personal computer.

FIG. 17 shows a configuration example of the general-purpose personal computer. This personal computer includes a built-in CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input unit 1006, an output unit 1007, a storage unit 1008, and a communication unit 1009 are connected to the input/output interface 1005. The input unit 1006 is constituted of an input device such as a keyboard and a mouse. The user inputs an operation command into the input device. The output unit 1007 outputs a processing operation screen and an image that is a result of processing to a display device. The storage unit 1008 is constituted of a hard disk drive and the like that store programs and various types of data. The communication unit 1009 is constituted of a LAN (Local Area Network) adapter and the like. The communication unit 1009 executes communication processing via a network represented by the Internet. A drive 1010 is further connected thereto. The drive 1010 reads and writes data from/in a removable medium 1011. The removable medium 1011 includes a magnetic disk (including flexible disk), an optical disc (including CD-ROM (Compact Disc-Read Only Memory), a DVD (Digital Versatile Disc)), a magneto-optical disk (including MD (Mini Disc)), a semiconductor memory, and the like.

The CPU 1001 executes various types of processing according to programs stored in the ROM 1002 or programs read out from the removable medium 1011 such as the magnetic disk, the optical disc, the magneto-optical disk, and the semiconductor memory and installed in the storage unit 1008 and loaded from the storage unit 1008 into the RAM 1003. For example, data necessary for the CPU 1001 to execute various types of processing is further stored in the RAM 1003 if necessary.

As described above, the above-mentioned series of processing are performed in the configured computer by the CPU 1001 loading the programs, which are stored in the storage unit 1008, for example, into the RAM 1003 via the input/output interface 1005 and the bus 1004 and executing the loaded programs.

The programs executed by the computer (CPU 1001) can be provided by being recorded on the removable medium 1011 serving as, for example, a package medium. Further, the programs can be provided via a wired or wireless transmission medium. The wired or wireless transmission medium includes a local area network, the Internet, and digital satellite broadcasting.

In the computer, by the removable medium 1011 being mounted on the drive 1010, the programs can be installed in the storage unit 1008 via the input/output interface 1005. Further, the programs can be received by the communication unit 1009 via the wired or wireless transmission medium and installed in the storage unit 1008. Otherwise, the programs can be installed in the ROM 1002 or the storage unit 1008 in advance.

Note that the programs executed by the computer may be programs in which the processes are performed in a time series in the order described herein or may be programs in which the processes are performed in parallel or at a necessary timing, for example, when called.

Further, as used herein, the term "system" means a collection of a plurality of components (apparatuses, modules (parts), etc.). All the components may be housed in an identical casing or do not need to be housed in the identical casing. Therefore, a plurality of apparatuses housed in separate casings and connected to one another via a network and a single apparatus including a plurality of modules housed in a single casing are both the system.

Note that the embodiment of the present technology is not limited to the embodiment and various modifications can be made without departing from the essence of the present technology.

For example, the present technology takes a cloud computing configuration in which a single function is distributed to a plurality of apparatuses via a network and processed by the plurality of apparatuses in a cooperation manner.

Further, the steps described above with reference to the flowchart can be executed by a single apparatus and can also be distributed to a plurality of apparatuses and executed by the plurality of apparatuses.

In addition, when a single step includes a plurality of processes, the plurality of processes of the single step can be executed by a single apparatus and can also be distributed to a plurality of apparatuses and executed by the plurality of apparatuses.

Note that the present technology can also take the following configurations.

(1) An image processing apparatus, including
a plurality of arithmetic processing units that perform processing on each of ranges of an image obtained by capturing a surgical site of a patient, in a time division manner, the ranges being obtained by dividing the image in a vertical direction, in which
the arithmetic processing units each perform processing with the image divided by the number of arithmetic processing units in a horizontal direction being time-divided in the vertical direction.

(2) The image processing apparatus according to (1), in which
the plurality of arithmetic processing units are constituted of a plurality of GPUs (Graphical Processing Units), and
the arithmetic processing unit performs the processing on the image divided by the number of GPUs in the horizontal direction.

(3) The image processing apparatus according to (1) or (2), in which
the processing performed on the image is filtering processing using n-stage filters.

(4) The image processing apparatus according to (3), in which
the n-stage filters sequentially perform processing on the ranges obtained by dividing the image in the vertical direction, downward from a range at an uppermost stage in the vertical direction in a time division manner.

(5) The image processing apparatus according to any of (1) to (4), further including
a timing control unit that controls a timing for computation of the arithmetic processing unit on the basis of the amount of processing performed on the image and the processing speed of the arithmetic processing unit, the amount of processing being calculated on the basis of the number of divisions of the image in the horizontal direction and the number of divisions of the image in the vertical direction.

(6) The image processing apparatus according to any of (1) to (5), in which
a processing range of the ranges obtained by time-dividing the image in the vertical direction includes a reference pixel necessary for processing in a second period, the processing range being processed in a first period, the second period being subsequent to the first period.

(7) The image processing apparatus according to (6), in which
the arithmetic processing unit includes a memory for buffering a result of processing, and
in the processing in the second period, arithmetic processing is executed using a result of processing corresponding to the reference pixel, the result of processing in the first period being buffered in the memory and including the result of processing corresponding to the reference pixel.

(8) The image processing apparatus according to (3), in which
the arithmetic processing unit includes a memory for buffering a result of processing,
a processing range for an uppermost stage in the vertical direction of the ranges obtained by dividing the image in the vertical direction is a range including the number of lines of a reference pixel necessary for processing of the filters in processing ranges for a second stage and subsequent stages in the vertical direction, the processing range for the uppermost stage in the vertical direction being processed by the filter at each stage, and
the arithmetic processing unit executes, when executing arithmetic processing for the processing by the filter, arithmetic processing using a result of processing corresponding to the reference pixel in processing using the reference pixel, the result of processing of filtering processing up to a pre-stage being buffered in the memory and including the result of processing corresponding to the reference pixel.

(9) The image processing apparatus according to any of (1) to (8), in which
the arithmetic processing unit performs at least magnification processing on the image obtained by capturing the surgical site of the patient.

(10) The image processing apparatus according to any of (1) to (9), in which
the image obtained by capturing the surgical site of the patient is an image captured by an endoscope.

(11) The image processing apparatus according to any of (1) to (9), in which
the image obtained by capturing the surgical site of the patient is an image captured by a microscope.

(12) An image processing method for an image processing apparatus, the image processing apparatus including a plurality of arithmetic processing units that perform processing on each of ranges of an image captured by an imaging apparatus, in a time division manner, the ranges being obtained by dividing the image in a vertical direction, in which
the arithmetic processing units each perform processing with the image divided by the number of arithmetic processing units in a horizontal direction being time-divided in the vertical direction.

(13) The image processing method according to (12), in which
the image is an image captured by an endoscope.

(14) The image processing method according to (12), in which the image is an image captured by a microscope.

(15) A surgical system, including:
an imaging apparatus that captures a surgical site of a patient; and
an image processing apparatus including
a plurality of arithmetic processing units that perform processing on each of ranges of an image captured by the imaging apparatus, in a time division manner, the ranges being obtained by dividing the image in a vertical direction, the arithmetic processing units each performing processing with the image divided by the number of arithmetic processing units in a horizontal direction being time-divided in the vertical direction.

DESCRIPTION OF REFERENCE NUMERALS

11 information processing unit
31 CPU 32 main memory
33 bus
34 IF card
35, 35-1, 35-2 GPU card
51 DMA controller
71 camera IF
72 display IF
73, 91, 91-1, 91-2 PCIe bridge
92, 92-1, 92-2 processor
93, 93-1, 93-2 memory

The invention claimed is:

1. A medical image processing system, comprising:
 circuitry configured to
  obtain a medical image generated by a medical imaging device;
  perform processing on the medical image by time-dividing in a vertical direction,
 wherein a first processing range for first processing on the medical image in a first period obtained by time-dividing the medical image in the vertical direction includes a reference area for second processing performed on the medical image in a second period subsequent and adjacent to the first period, the reference area including a plurality of pixels, and
 the second processing on the medical image uses results of the first processing of the reference area.

2. The medical image processing system according to claim 1, wherein the circuitry includes graphic processing circuits.

3. The medical image processing system according to claim 1, wherein the circuitry is configured to perform filtering processing using n-stage filters on the medical image.

4. The medical image processing system according to claim 3, wherein the filtering processing is a sequentially processing on a predetermined time ranges obtained by dividing the medical image in the vertical direction, downward from a predetermined time range at an uppermost stage in the vertical direction.

5. The medical image processing system according to claim 4, wherein the circuitry is configured to control a timing for computation based on an amount of processing performed on the medical image and a processing speed.

6. The medical image processing system according to claim 5, wherein a processing range of the predetermined time ranges obtained by time-dividing the medical image in the vertical direction includes a reference pixel necessary for processing in a second period, the processing range being processed in a first period, the second period being subsequent to the first period.

7. The medical image processing system according to claim 6, wherein the circuitry includes a memory configured to buffer a result of processing, and in the processing in the second period, the circuitry is configured to execute using a result of processing corresponding to the reference pixel, the result of processing in the first period being buffered in the memory and including the result of processing corresponding to the reference pixel.

8. The medical image processing system according to claim 1, the circuitry includes a memory configured to buffer a result of processing, a processing range for an uppermost stage in the vertical direction of the ranges obtained by dividing the medical image in the vertical direction is a range including a number of lines of a reference pixel necessary for processing of the filters in processing ranges for a second stage and subsequent stages in the vertical direction, the processing range for the uppermost stage in the vertical direction being processed by the filter at each stage, and the circuitry executes, when executing arithmetic processing for the processing by the filter, arithmetic processing using a result of processing corresponding to the reference pixel in processing using the reference pixel, a result of processing of filtering processing up to a pre-stage being buffered in the memory and including the result of processing corresponding to the reference pixel.

9. The medical image processing system according to claim 1, wherein the medical image is generated by an endoscope.

10. An endoscope image processing system, comprising:
 circuitry configured to
  obtain an endoscope image generated by an endoscope imaging device;
  perform processing on the endoscope image by time-dividing in a vertical direction,
 wherein a first processing range for first processing on the endoscope image in a first period obtained by time-dividing the endoscope image in the vertical direction includes a reference area for second processing on the endoscope image in a second period subsequent and adjacent to the first period, the reference area including a plurality of pixels, and
 the second processing on the endoscope image uses results of the first processing of the reference area.

11. A method of image processing by circuitry, comprising:
 obtaining an endoscope image generated by an endoscope imaging device;
 performing processing on the endoscope image by time-dividing in a vertical direction,
 wherein a first processing range for first processing on the endoscope image in a first period obtained by time-dividing the endoscope image in the vertical direction includes a reference area for second processing on the endoscope image in a second period subsequent and adjacent to the first period, the reference area including a plurality of pixels, and
 the second processing on the endoscope image uses results of the first processing of the reference area.

12. The method of image processing by circuitry according to claim 11, wherein the circuitry includes graphic processing circuits.

13. The method of image processing by circuitry according to claim 11, wherein the method further includes to perform filtering processing using n-stage filters on the medical image.

14. The method of image processing by circuitry according to claim 13, wherein the filtering processing is a sequentially processing on a predetermined time ranges obtained by dividing the medical image in the vertical direction, downward from a predetermined time range at an uppermost stage in the vertical direction.

15. The method of image processing by circuitry according to claim 14, wherein the method further includes to control a timing for computation based on an amount of processing performed on the medical image and a processing speed.

16. The method of image processing by circuitry according to claim 15, wherein a processing range of the predetermined time ranges obtained by time-dividing the medical image in the vertical direction includes a reference pixel necessary for processing in a second period, the processing range being processed in a first period, the second period being subsequent to the first period.

17. The method of image processing by circuitry according to claim 16, wherein the circuitry includes a memory configured to buffer a result of processing, and in the processing in the second period, the method further includes to execute using a result of processing corresponding to the reference pixel, the result of processing in the first period being buffered in the memory and including the result of processing corresponding to the reference pixel.

18. The method of image processing by circuitry according to claim 11, the circuitry includes a memory configured to buffer a result of processing, a processing range for an uppermost stage in the vertical direction of the ranges obtained by dividing the medical image in the vertical direction is a range including a number of lines of a reference pixel necessary for processing of the filters in processing ranges for a second stage and subsequent stages in the vertical direction, the processing range for the uppermost stage in the vertical direction being processed by the filter at each stage, and the circuitry executes, when executing arithmetic processing for the processing by the filter, arithmetic processing using a result of processing corresponding to the reference pixel in processing using the reference pixel, a result of processing of filtering processing up to a pre-stage being buffered in the memory and including the result of processing corresponding to the reference pixel.

* * * * *